(12) United States Patent
Reece

(10) Patent No.: US 11,577,919 B2
(45) Date of Patent: Feb. 14, 2023

(54) SYSTEM FOR HANDLING FLEXIBLE MATERIAL

(71) Applicant: LOOP TECHNOLOGY LTD, Dorset (GB)

(72) Inventor: Alun Reece, Dorset (GB)

(73) Assignee: Loop Technology Ltd, Dorset (GB)

( * ) Notice: Subject to any disclaimer, the term of this patent is extended or adjusted under 35 U.S.C. 154(b) by 59 days.

(21) Appl. No.: 16/771,662

(22) PCT Filed: Dec. 17, 2018

(86) PCT No.: PCT/IB2018/060184
§ 371 (c)(1),
(2) Date: Jun. 10, 2020

(87) PCT Pub. No.: WO2019/123209
PCT Pub. Date: Jun. 27, 2019

(65) Prior Publication Data
US 2020/0361720 A1  Nov. 19, 2020

(30) Foreign Application Priority Data
Dec. 18, 2017  (GB) .................................. 1721130

(51) Int. Cl.
| | |
|---|---|
| *B65G 49/06* | (2006.01) |
| *B65H 3/10* | (2006.01) |
| *B25J 15/06* | (2006.01) |

(52) U.S. Cl.
CPC ........ *B65G 49/067* (2013.01); *B25J 15/0616* (2013.01); *B65G 49/061* (2013.01); *B65H 3/10* (2013.01); *B65G 2249/04* (2013.01)

(58) Field of Classification Search
CPC .. B65G 49/061; B65G 49/067; B65G 47/914; B65G 2249/04; B65H 3/10; B25J 15/0616
See application file for complete search history.

(56) References Cited

U.S. PATENT DOCUMENTS

| | | | |
|---|---|---|---|
| 4,527,783 A | 7/1985 | Collora et al. | |
| 5,116,037 A * | 5/1992 | Gerlier | B65H 29/36 |
| | | | 271/3.11 |
| 5,913,268 A | 6/1999 | Jackson et al. | |
| 6,053,492 A * | 4/2000 | Newsome | B65H 3/10 |
| | | | 271/105 |
| 6,244,584 B1 * | 6/2001 | Holbrook | B65H 3/10 |
| | | | 271/3.07 |

(Continued)

FOREIGN PATENT DOCUMENTS

| | | | |
|---|---|---|---|
| DE | 10 2008 051095 | 4/2010 | |
| DE | 102008051095 A1 * | 4/2010 | .............. B41F 21/08 |
| WO | 2017/072741 | 5/2017 | |

*Primary Examiner* — Dean J Kramer
(74) *Attorney, Agent, or Firm* — William H. Bollman

(57) ABSTRACT

A system for handling sheets of flexible material. The system comprises a first roller (5.2) which comprises a plurality of first releasable connectors (3.2) and a second roller (5.3) which comprises a plurality of second releasable connectors. The system further comprises an array of third releasable connectors (2.1) which is displaceable between at least the first and second rollers (5.2, 5.3). The first, second and third releasable connectors releasably attach to a sheet of flexible material in use.

18 Claims, 12 Drawing Sheets

SECTION A-A

(56) References Cited

U.S. PATENT DOCUMENTS

| | | | | |
|---|---|---|---|---|
| 6,357,505 | B1* | 3/2002 | Jurgens | B65C 9/14 |
| | | | | 156/564 |
| 6,477,951 | B2* | 11/2002 | Fujimoto | B41F 21/00 |
| | | | | 101/183 |
| 7,000,917 | B2* | 2/2006 | Helmstadter | B41F 21/00 |
| | | | | 101/230 |
| 2005/0093219 | A1 | 5/2005 | Baumann | |
| 2007/0187026 | A1 | 8/2007 | Burgess et al. | |
| 2014/0199153 | A1 | 7/2014 | Reinhold et al. | |
| 2018/0326595 | A1 | 11/2018 | Cox et al. | |

* cited by examiner

DETAIL B

SECTION A-A

DETAIL D

SYSTEM FOR HANDLING FLEXIBLE MATERIAL

FIELD OF THE INVENTION

The present invention relates to a system for handling flexible material, more particularly the invention relates to a system for handling flexible material comprising first and second rollers and a plurality of releasable connectors.

BACKGROUND

Within the aerospace industry, several new aircraft have entered production that use large-scale carbon fibre elements in their construction, especially in the wings. This allows for the use of much lighter wing structures while maintaining the strength needed for a commercial aircraft.

To ensure the strength of the wings of the new generation of airliners, it is imperative that the carbon fibre material that makes up the wing is laid down with a high degree of accuracy and without compromising the structural integrity of the material by creasing, stretching, crushing, tearing or otherwise permanently deforming the material. If a single compromised sheet is incorporated into an aircraft it could structurally compromise the entire aircraft and cause a failure and potentially, a crash.

Using workers to lay down these sheets can often cause these problems, as the forces that they would exert on the material cannot be monitored or accurately controlled. Humans are also capable of cutting corners with their work to make it easier for them, often to the detriment of the quality of the product. In this case, this could be catastrophic.

The aim of the present invention is to provide a system for laying sheets of material which avoids the above-mentioned drawbacks and to reduce costs during manufacture.

PRIOR ART

A number of systems have been developed in an attempt to resolve the aforementioned problems. These include the following:

In our co-pending UK Patent Application GB1519284 describes a flexible materials manipulator comprising: a plurality of releasable connectors supported on a main carrier which releasable connectors, when actuated, lift or release the flexible material. Means are provided to vary at least one of the orientation and/or location of the connectors with respect to a surface defined in three dimensions, such that in use the flexible material is placed in a precise user selected position on the three-dimensional surface.

Means may be provided to vary at least one of the orientation and/or location of the connectors whilst attached to a sheet of flexible material so as to deform the sheet to a new shape. The main carrier may be a flexible planar surface which may be deformed by the means provided to vary at least one of the orientation and/or location of the connectors. The main carrier may be formed from a plurality of parallel flexible strips arranged in pairs. The releasable connectors are individually addressable so that they are actuated independently. The releasable connectors may be suction cups, vacuum connectors, needle connectors, cryogenic connectors, electromagnetic connectors or electrostatic connectors. The main carrier may be supported on a gantry or a robot which may move the main carrier between a layup table and a mould.

Japanese Patent Application JP 2012210997 A (TDK CORP) discloses a sheet supporting device comprising a roller for a continuously moving sheet with an array of air suction holes in its exterior surface.

STATEMENT OF THE INVENTION

According to a first aspect of the invention there is provided a system for handling a sheet of flexible material, the system comprising: a first roller which comprises a plurality of first releasable connectors; a second roller which comprises a plurality of second releasable connectors; and an array of third releasable connectors; wherein the array of third releasable connectors is displaceable between at least the first and second rollers and the first, second and third releasable connectors releasably attach to the sheet of flexible material in use.

The system may be for handling sheets of fabric, such as carbon fibre or glass fibre fabric or lightning strike material. The system may be used to facilitate the handling, transport, storage and/or manipulation of sheets of material, for example in the aerospace, marine, or wind turbine industries. In use, the leading edge of a sheet of flexible material, such as piece of fabric may be picked up by the first releasable connectors of the first roller, wound partially around the first roller, then transferred onto the second roller by the displaceable array of third releasable connectors. The sheet of flexible material may then be engaged by the second releasable connectors of the second roller and wound around the second roller. As such the sheet of flexible material may be stored around the second roller, and the first roller may control the picking up of flexible material and/or the placing of flexible material from the system.

In preferred embodiments, the first and/or second rollers are substantially cylindrical. Cylindrical first and/or second rollers may be rotatable about longitudinal rotational axes extending therethrough. The rotational axes may be the central longitudinal axes of the cylindrical rollers. Cylindrical first and/or second rollers may be right cylinders.

In embodiments where the first and second rollers are both at least substantially cylindrical, the rollers may have substantially equal radii. In alternative embodiments, the rollers may have different radii.

Alternatively, or additionally, one or both of the first and second rollers may be an elongate cuboid, an elongate pentagonal prism, an elongate hexagonal prism or some other elongate polygonal prism; the first and/or second rollers may have rotational axes parallel to the edges between lateral faces of the prismatic rollers. In some embodiment, the rollers be right prisms and may have rotational axes normal to their end faces.

In preferred embodiments, the first and second rollers have rotational axes which are fixed with respect to each other. In alternative embodiments, the first and second rollers may be displaceable and/or reorientable with respect to each other such that their rotational axes are displaceable and/or reorientable with respect to each other.

The first and second rollers may have substantially equal lengths. The length of one or both of the first and second rollers may be parallel to the rotational axis of the roller.

The first and second rollers may have rotational axes which are parallel to each other and may be arranged such that at least a portion of the lengths of the rollers overlap (for example, such that a line perpendicular to the rotational axes of the parallel rollers could be drawn such that it intersected both the first and second rollers). This may allow flexible material to be wound off of one of the rollers onto the other without being twisted.

In some embodiments—wherein the first and second rollers have equal lengths and parallel rotational axes—a first end of the first roller is coplanar to a first end of the second roller within a plane orthogonal to the rotational axes of the rollers, and a second end of the first roller is coplanar to a second end of the second roller within a plane orthogonal to the rotational axes of the rollers.

The first and second rollers may have substantially horizontal rotational axes.

The first and second rollers may be separated such that they are not in direct contact with each other, this may allow the rollers to rotate, or to be rotated in the same direction without interfering with each other's rotation.

In some embodiments, one or both of the ends of one or both of the rollers may be flanged; for example, such that a roller defines a spindle.

In some embodiments, the first and/or second rollers may comprise a substantially solid body, may comprise an outer surface surrounding a substantially hollow interior, or may comprise a framework of interconnecting panels and/or members (for example, upon and/or within which releasable connectors are supported).

In some embodiments, the outer surface of one or both of the first and second rollers may be defined wholly or in part by the releasable connectors supported thereon and/or by portions or flexible material engaging elements thereof.

In some embodiments, one or both of the first and second rollers are substantially hollow with a substantially solid outer surface. A plurality of apertures may be formed through the substantially solid outer surfaces, and the first and/or second releasable connectors comprised by the first and second rollers may be located within the rollers and may extend partially through and/or may engage with the flexible material through some or all of the apertures.

In alternative embodiments, the first and/or second releasable connectors may be supported on the exterior of an unbroken outer surface of hollow or solid first and/or second rollers.

In some embodiments, rotation of one or both of the first and second rollers may be driven, for example by one or more motors. In some embodiments both the first and second rollers may both be driven such that they rotate together at the same angular velocity. In other embodiments both the first and second rollers may be driven selectively and independently, for example such that they may be driven to rotate with different angular velocities and/or in different directions.

The first and second releasable connectors may be arranged to engage with and/or connect to sheets of flexible material. In use, the first and second releasable connectors may pick up and/or hold sheets of flexible material onto the roller by which they are comprised.

Preferably, the first releasable connectors are supported on or in the first roller and the second releasable connectors are supported on or in the second roller. For example, the first and second releasable connectors may be supported on the outer surfaces of the rollers, within apertures or indentations formed in the outer surfaces of the rollers, and/or within interior cavities comprised by the rollers.

The first releasable connectors may be located and/or supported at, on, in and/or through one or more lateral faces of the first roller, and/or the second releasable connectors may be located and/or supported at, on, in and/or through one or more lateral faces of the second roller.

The lateral faces of the first and/or second rollers being the side faces intermediate the ends of the rollers, for example the curved surface of a cylindrical roller, or the parallelogrammatic faces of a prismatic roller.

Preferably, the first and second rollers each comprise a pair of end faces (which may be parallel to each other) and one (for example, in the case of cylindrical rollers) or more lateral faces (for, example in the case of prismatic rollers) arranged therebetween. The lateral faces may be at right angles to the end faces (for example, wherein the rollers are right cylinders or right prisms). The rotational axes of the rollers may be perpendicular to the end faces of the rollers and/or parallel to the lateral faces of the rollers. Longitudinal axes of these rollers extend between the end faces of the rollers and may be parallel to the rotational axes.

For example, in embodiments wherein the first and second rollers are cylindrical the first and second releasable connectors may be located on the curved lateral surfaces of the first and second rollers respectively.

In some embodiments, one, some or all of the first and second releasable connectors may be arranged to engage with flexible material at surfaces of the first and second rollers respectively. For example, the releasable connectors may be vacuum connectors with inlets in a surface of the roller, electromagnetic connectors embedded within surface of the rollers, or grippers arranged to press flexible material against surfaces of the rollers.

In some embodiments, the first and second releasable connectors may be arranged to engage with and/or hold flexible material at the surface of lateral faces of the first and second rollers respectively. For example, the first and second releasable connectors may be arranged to engage with flexible material at the curved surfaces of cylindrical first and second rollers respectively.

In some embodiments, a plurality of first releasable connectors may be distributed over the length of the first roller, and/or a plurality of second releasable connectors may be distributed over the length of the second roller. Preferably, first releasable connectors are distributed over a majority of, or substantially all of the length of the first roller, and/or second releasable connectors are distributed over a majority of, or substantially all of the length of the second roller.

In some embodiments, the first and/or second releasable connectors may be regularly spaced over one or more surfaces of the first and/or second rollers respectively. The releasable connectors may be regularly spaced over one or more lateral surfaces of the rollers. For example, releasable connectors may be arranged in a regularly spaced longitudinal linear arrangement along a lateral face of one or both of the rollers or may be arranged in a regularly spaced grid pattern over one or more lateral faces of one or both of the rollers.

In alternative embodiments, the releasable connectors may be irregularly spaced over one or more lateral surfaces of the rollers upon which they are supported. In other embodiments, one, some, or all of the releasable connectors may be displaceable on or removeable from the surfaces of the rollers on which they are supported. For example, one or more releasable connectors may be slide-able along a track or slot on or in which they are supported, and/or may be removable and connectable to any of a plurality of sockets or other connector supporting means supported on the roller.

In some embodiments, the first releasable connectors are regularly spaced along a longitudinal line along the full length of a lateral face of the first roller, and the second releasable connectors are regularly spaced along a longitudinal line along the full length of a lateral face of the second roller. This allows the releasable connectors to engage with sheets of flexible material adjacent to and along edges thereof as they are picked up onto the rollers. In other embodiments one or both of the first and second rollers may comprise a plurality of parallel longitudinal linear regularly spaced arrangements of releasable connectors along faces thereof.

In some embodiments, the first and/or second releasable connectors may be arranged in a grid pattern over all, or a portion of, the surface of one or more faces of the rollers.

One, some, or all of the first and/or second releasable connectors may be supported and/or located on the exterior of the first and second rollers, for example, on the curved outer surface of a cylindrical roller, on one or more of the parallelogrammatic lateral faces of a prismatic roller, or on struts of the framework of a roller.

Alternatively, or additionally one, some, or all of the first and/or second releasable connectors may be located partially, substantially, or entirely within the first and/or second rollers respectively. The releasable connectors may be supported, fitted and/or embedded partially, substantially, or entirely within the rollers. For example, releasable connectors may be located within apertures or indentations formed in an exterior surface of one or both of the rollers, or within a substantially hollow interior of the one or both of the rollers.

The first and/or second releasable connectors which are located on the surface of, or partially within the rollers, may extend radially outwards from the surface of the roller (with respect to its axis or rotation).

In some embodiments, a plurality of indentations may be formed in the surface of the first and/or second rollers and first and/or second releasable connectors may be located and/or supported therein. One, some, or all of the indentations may contain single releasable connectors, for example the indentations may be dimensioned to tightly receive a releasable connector. Alternatively, or additionally, one, some or all of the indentations may contain multiple releasable connectors, for example elongate trenches may extend along the surface of one or both of the rollers, within which releasable connectors are located. The releasable connectors may be located entirely or substantially within the indentations, or may protrude from them, for example extending radially away from the surface of the roller.

In some embodiments, the first and/or second roller may comprise one or more interior cavities within which one, some, or all of the first and/or second releasable connectors are partially or entirely located and/or supported. In some embodiments, the first and/or second roller may be substantially hollow and may comprise a single cavity within which releasable connectors are located and/or supported. In other embodiments one or both of the rollers may comprise a plurality of cavities, each having a single releasable connector located therein.

A plurality of apertures may be formed in the outer surface of the first and/or second rollers, these apertures may connect the interior cavities of the rollers to the exterior of the rollers. One, some, or all of the releasable connectors located within the cavities may be located within the apertures such that they protrude out of the cavities either to the surface of the roller or out from the surface of the rollers. Alternatively, or additionally, releasable connectors may be located entirely within the apertures, or within the apertures and protruding from the exterior of the roller.

Alternatively, or additionally, one, some, or all of the first and/or second releasable connectors may be located at least partially within the cavities and may not extend to the surface of the rollers.

In some embodiments, releasable connectors may act and/or connect through the apertures; these may be releasable connectors which do not extend to or from the surface of the rollers. For example, vacuum connectors may suck air through the apertures so as to provide a suction force sufficient to hold a sheet of flexible material to the surface of a roller adjacent to or surrounding the aperture.

One, some, or all of the apertures may correspond to individual releasable connectors, such that a single releasable connector may be located within, may extend through, or may act through a single aperture. Alternatively, or additionally, one, some, or all of the apertures may correspond to a plurality of releasable connectors, such that multiple releasable connectors may be located within, may extend through, or may act through a single aperture. For example, an aperture may be an elongate slot in the exterior of the roller, through which a plurality of releasable connectors extend.

In some embodiments, one, some, or all of the releasable connectors may be apertures formed in the outer surface of the rollers. For example, the releasable connectors may be apertures connecting the exterior of a roller to a hollow interior of the roller within which a vacuum is generated so as to provide a suction force through the apertures. This may hold a sheet of flexible material to the surface of the rollers at the apertures. In some such embodiments, the releasable connectors defined by apertures may be actuated to release a sheet of flexible material to which they connected by reducing the strength of or removing the vacuum within the interior of the roller. In other embodiments, one some or all of the connector defining apertures may comprise closure mechanisms such as shutters to close the apertures thereby preventing suction occurring therethrough.

One, some, or all of the first, second and/or third releasable connectors may be or may comprise suction cups, vacuum connectors, needle connectors, cryogenic connectors, manual grippers, electromagnetic connectors, and/or electrostatic connectors.

One, some, or all of the first, second and/or third releasable connectors may each comprise a flexible material engaging element, which may in use be in contact with flexible material engaged by the connector. For example, flexible material engaging elements may include the face of a suction cup, or the inlet of a vacuum connector, or an electrostatic connector.

In some embodiments, the flexible material engaging elements may be directional, and the first and/or second releasable connectors may be oriented radially outwards with respect to the first and/or second rollers. For example, suction cups comprised by the releasable connectors may be arranged facing outwards along an axis extending radially from a roller.

In some embodiments, the flexible material engaging elements of one, some, or all of the first and/or second releasable connectors may protrude slightly from the surface of the first and/or second rollers. Alternatively, or additionally, the flexible material engaging elements of one some or all of the first and/or second releasable connectors may be level with, coplanar to, and/or comprised by the surface of the roller.

In preferred embodiments, the outermost portions and/or flexible material engaging elements of one, some, or all of the first and/or second releasable connectors may be flush with an outer surface of the first and/or second roller respectively. For example, they may be flush with one or more lateral faces or surfaces of the rollers.

In some embodiments one, some, or all of the first and/or second releasable connectors may be formed integrally with the first and/or second rollers respectively.

In some embodiments, the first, second, and/or third releasable connectors may be individually actuatable to individually connect to or release a sheet of fabric. In some embodiments the magnitude of the suction or attractive force created by or passing through each individual releasable connector may vary and/or may be varied or controlled by some manual or automatic control means.

In use, the first and second releasable connectors may engage with sheets of flexible material such that it may be picked up, wound, and/or held onto the first or second rollers respectively.

In order to pick up a sheet of flexible material, the system may be arranged such that a roller is adjacent to a sheet of flexible material to be picked up; this may be achieved by displacing the system itself and/or by displacing the sheet of flexible material. Typically, the roller is arranged above an edge of the sheet flexible material, with the edge being arranged parallel to a longitudinal axis of the roller. Before the roller is brought into contact with the sheet of flexible material, the roller may be rotated such that releasable connectors comprised by the roller have flexible material engaging elements oriented towards the sheet of flexible material and/or the edge thereof.

In order to pick up a sheet of flexible material, the system and/or the sheet of flexible material to be picked up may be displaced to an arrangement where the sheet of flexible material is adjacent one of the first and second rollers. Typically, the roller is arranged at an edge of the sheet of flexible material, with the edge being arranged parallel to a longitudinal axis of the roller. The roller may be rotated such that releasable connectors comprised by the rollers have flexible material engaging elements adjacent the sheet of flexible material.

The releasable connectors may then engage the sheet of flexible material—typically at, adjacent and/or proximate to an edge of the flexible material—and the roller may then be rotated to wind the sheet of flexible material onto the roller. The releasable connectors comprised by the rollers only engage the innermost layer of a sheet of flexible material wound around roller, thereby allowing additional layers to be freely wound onto or off of the roller.

In preferred embodiments, the first roller is a pick-up and place roller, and the second roller is a storage roller. In use, a sheet of flexible material may be picked up onto the first roller as described above and the first roller may complete a partial revolution to wind the sheet of flexible material partially therearound (for example, such that the leading edge of the sheet of flexible material is at the top of the roller).

The leading edge of the sheet of flexible material may then be transferred from the first roller to the second roller (preferably by the array of third releasable connectors) where it may be engaged by the releasable connectors comprised by the second roller. The second roller may then be rotated to wind the sheet of flexible material therearound, thereby pulling the sheet of flexible material over the first roller.

As a first edge of a sheet of flexible material stored by the system is engaged by the releasable connectors of the second roller (the storage roller), the majority of the sheet of flexible material is wound around the second roller with a portion adjacent a second opposite edge extending from the second roller and being draped over the first roller.

Preferably, the array of third releasable connectors is for transferring flexible material between the first and second rollers, from an origin roller to a destination roller. In use, some or all of the third releasable connectors may engage with a sheet of flexible material which is at least partially wound onto one of the first or second rollers—typically at or adjacent an edge of the sheet of flexible material—and the array of third releasable connectors may then be displaced from the origin roller to the destination roller, where the releasable connectors of the destination roller may engage with the sheet of flexible material, and the third releasable connectors of the array may disengage with the sheet of flexible material.

The array of third releasable connectors is preferably displaceable to and from at least a first arrangement wherein the array is arranged to engage with a sheet of flexible material connected to, supported by and/or wound around the first roller, and a second arrangement wherein the array is arranged to engage with a sheet of flexible material connected to, supported by and/or wound around the second roller.

The third releasable connectors may be arranged to engage with and/or connect to sheets of flexible material in use and the array may pick up, hold, and carry sheets of flexible material in use.

The third releasable connectors comprised by the array may be in a fixed orientation with respect to each other and/or with respect other components of the system (such as the first and second rollers). Alternatively, one, some or all of the releasable connectors may be reorientable with respect to other releasable connectors and/or other components of the system.

In some embodiments, each of the releasable connectors may be individually reorientable, alternatively or additionally all of, or groups of the third releasable connectors may be reoriented in same manner. The third releasable connectors may be manually reorientable by a user; alternatively, or additionally, the system may comprise one or more actuators for reorienting one, some or all of the third releasable connectors. These actuators may be controlled directly by a user, may reorient the third releasable connectors in response to control signals from some control means and/or may automatically reorient the third releasable connectors (for example on a timed basis, or in response to specific stimuli).

In some embodiments each third releasable connector may be individually addressable in order to match the shape of a sheet of material being handled or to match the shape of the surface of a roller or some other structure onto or from which the sheet of flexible material is being deposited or lifted.

In embodiments where the orientations of the third releasable connectors comprised by the array are fixed with respect to each other, the third releasable connectors may be substantially parallel to one another and may be oriented in substantially the same direction. For example, in embodiments where the third releasable connectors are vacuum connectors in fixed orientations they may be arranged such that inlets comprised by the vacuum connectors are facing in the substantially the same direction.

Alternatively, or additionally flexible material engaging elements of third releasable connectors which have fixed orientations with respect to one another may coplanar. For example, in embodiments where the third releasable connectors are vacuum connectors in fixed orientations they may be arranged such that inlets comprised by the vacuum connectors are all within a single plane.

In particular embodiments, the third releasable connectors may be oriented in the same direction and may comprise coplanar flexible material engaging elements. The flexible material engaging elements may be located within a plane orthogonal to the orientation of the releasable connectors.

In alternative embodiments, the flexible material engaging elements comprised by the third releasable connectors may all be in curved imaginary surface, for example a portion of the curved surface of a cylinder. The third releasable connectors may be arranged such that they are normal to the curved imaginary surface. In some embodiments, the third releasable connectors may all be in an imaginary surface with the same shape as one or both the of the first and second rollers, in other embodiments they may be in the imaginary surface of a larger cylinder so as to conform to the surface of the outer winding of flexible material wound around a roller.

The third displaceable connectors may maintain their fixed orientation with respect to one another as they are displaced and/or reoriented with respect to other components of the system.

Preferably the array of third releasable connectors is displaceable between at least a first arrangement where they are in contact with flexible material on first roller (preferably at least the initial/innermost winding of first roller) and a second arrangement where they are in contact with flexible material on second roller (preferably at least the initial/innermost winding thereof).

In some embodiments, the system may comprise a displaceable support upon or from which the array of third releasable connectors is supported. The displaceable support may comprise one or more plates, bodies, and/or frames of interconnected members upon and/or within which some or all of the third releasable connectors are supported and/or from which some or all of the third releasable connectors are suspended.

In preferred embodiments, the displaceable support is a single displaceable plate upon which the third releasable connectors are supported. In alternative embodiments, the displaceable support may be a curved plate.

In some embodiments, the third releasable connectors may be arranged to engage with and/or to hold flexible material at a surface of the displaceable support. The surface may be the under-surface of the displaceable support. For example, the third releasable connectors may be vacuum connectors with inlets with inlets formed in or flush with the lower face of a displaceable support in the form of a plate, or grippers arranged to press flexible material against the lower face of the support.

In some embodiments, the third releasable connectors (and/or flexible material engaging elements thereof) may be substantially flush with a face, which may be an under-surface, of the displaceable support. In alternative embodiments, the third releasable connectors (and/or flexible material engaging elements thereof) may protrude or extend slightly from the surface, such as the under-surface of the displaceable support.

In some embodiments, a face, which may be the under-surface, of the displaceable support may conform to a plane or curved imaginary surface within which the fabric engaging elements of the third releasable connectors are located.

In some embodiments, the under-surface of the displaceable support may comprise a plurality of apertures, some, or all of which may correspond to one or more third releasable connectors. For example, one or more third releasable connectors may each extend, be supported, or exert a force through an aperture in the under-surface of the displaceable support.

In some embodiments the apertures may be releasable connectors, where they provide access to a hollow interior of the displaceable support within which at least a partial vacuum is generated so as provide a suction force through the apertures.

In some embodiments, the displaceable support may be a generally horizontal plate with a plurality of apertures formed generally vertically therethrough, and a plurality of releasable connectors may each be supported within an aperture with their fabric engaging elements flush with the lower surface of the plate and the remainder of the releasable connectors protruding generally vertically out of the apertures above the plate, such that the third releasable connectors do not obstruct or prevent a sheet of material being held against the under-surface of the plate.

The array of releasable connectors may be distributed over a surface, such as the under-surface of the displaceable support.

The array of third releasable connectors may be regularly spaced. For example, in some embodiments, the array of releasable connectors may be arranged in a line with equal separation between each pair of adjacent connectors; in further embodiments, the array of third releasable connectors may comprise a plurality of such lines, which may be regularly spaced, parallel to, and coplanar to each other. In some embodiments the array of regularly spaced connectors may be a grid of third releasable connectors.

In some embodiments, the array of third releasable connectors and/or the displaceable support may extend in one direction a distance generally or substantially equal to the length of the rollers. This direction may be generally or substantially parallel to the length and the axes of rotation of the rollers (for example, in embodiments where the rollers are parallel to each other and the displaceable support is not freely reorientable in three dimensions with respect to the rollers).

This may allow the array of third releasable connectors to pick up and/or hold a sheet of flexible material (or a portion or edge thereof) across its full width, even when the sheet of flexible material is sufficiently wide to cover the entire length of the surface of the rollers.

In other embodiments, the array of third releasable connectors and/or the displaceable support may extend in one direction a distance substantially greater than the length of the rollers. In some such embodiments the array or support may extend in one direction more to approximately double, or to approximately triple the length of the rollers.

The array of third releasable connectors is displaceable at least between the first and second rollers. In embodiments where the system comprises a displaceable support for the array of third releasable connectors, the array of third releasable connectors may be displaced with respect to the first and second rollers by displacing the displaceable support upon or from which they are supported.

The array of third releasable conneters and/or the displaceable support may be displaceable in two dimensions with respect to the rollers. In preferred embodiments the array and/or the support may be displaceable within a plane orthogonal to the axes of rotation of the rollers.

In embodiments where the rollers have parallel horizontal axes of rotation, the array of third releasable connectors and/or the displaceable support may be displaceable in a generally or substantially horizontal direction (for lifting flexible material off of a roller or to deposit it onto a roller)

and a generally or substantially horizontal direction perpendicular to the axes of rotation of the rollers (for displacing the array between a location above the first roller to a location above the second roller and vice versa).

In other embodiments, the array of third releasable connectors and/or the displaceable support may be displaceable in three dimensions.

In some embodiments the displaceable support may be displaceable in a first direction by and/or along a first displacement means such as one or more rails, tracks, belts, pantographs, and/or telescopic supports. The first displacement means may be displaceable in a second direction (which may be substantially perpendicular to the first direction) by and/or along a second displacement means such as one or more rails, tracks, pantographs, and/or telescopic supports.

One of the first and second directions may be a substantially horizontal direction and the other of the first and second directions may be a substantially vertical direction. In some embodiments the second displacement means may be displaceable in a second direction (which may be perpendicular to both the first and second directions) by and/or a long a third displacement means such as one or more rails, tracks, pantographs, and/or telescopic supports.

For example, in some embodiments, the displaceable support may be mounted upon and displaceable along one or more rails or tracks extending in a first direction which may themselves be supported upon a carrier which is mounted on and displaceable along one or more ails or tracks extending in a second direction.

In some embodiments, the array of third releasable connectors and/or the displaceable support may be reorientable about one, two, or three axes with respect to the rollers.

In some embodiments, the system may comprise a support displacing means for displacing the displaceable support. Alternatively, or additionally, the displaceable support may be manually displaceable.

In some embodiments the support displacing means may displace the displaceable support along a first displacement means (such as one comprising one or more rails or tracks as described above), may displace a first displacement means along a second displacement means (such as a belt, pantograph or telescopic support linked to the displaceable support as described above), and/or may displace a second displacement means along a third displacement means (such as a belt, pantograph or telescopic support linked to a first displacement means as described above).

Alternatively, or additionally, the support displacing means may actuate a first displacement means (such as a belt, pantograph or telescopic support as described above) such that it displaces the displaceable support, may actuate a second displacement means such that displaces a first displacement means (such as a belt, pantograph or telescopic support linked to the displaceable support as described above), and/or may actuate a third displacement means such that it displaces a second displacement means (such as a belt, pantograph or telescopic support linked to a first displacement means as described above).

The support displacing means may comprise one or more motors which may be connected to one or more displacement means by belts, chain drives, interlocking gears, and/or other mechanical linkages.

The system may comprise a plurality of support displacing means which may independently displace a displaceable support in different directions (which may be perpendicular to each other). For example, the system may comprise a horizontal support displacing means for displacing the displaceable support horizontally and a vertical support displacing means for displacing the displaceable support vertically.

In some embodiments the support displacing means may comprise a crane such as an overhead crane or gantry crane.

In some embodiments the system comprises one or more pinch rollers which are each arranged adjacent one of the first and second rollers. Pinch rollers (or nip rolls) are rollers which in use press flexible material against a surface adjacent the pinch roller (for example, the surface of another roller or spindle to which the pinch roller is adjacent). Pinch rollers (or nip rolls) which are arranged adjacent one of the first or second rollers are preferably arranged to press sheets flexible material against the roller as the sheets of flexible material are wound onto or over the roller.

Pressing a sheet of flexible material onto a roller may ensure that there is sufficient friction between the flexible material and the surface of the roller to allow the flexible material to be wound around the roller. This may be especially important on a pick-up and place roller which flexible material is wound over but not onto and which may not have releasable connectors over the entirety of its circumference.

A pinch roller may also ensure that successive layers of a sheet of flexible material are wound tightly and securely onto a roller when a sheet of flexible material is wound a round a roller multiple times (for example, onto a storage roller).

Pinch rollers comprised by the system preferably have substantially smaller radii than the first and second rollers; in some embodiments, the radii of the pinch rollers are approximately one eighth of the radii of the first and second rollers. The pinch rollers may have generally or substantially equal lengths to the first and second rollers; in other embodiments the pinch rollers may have significantly greater lengths than the first and second rollers. In some embodiments, all or a part of the surfaces of one, some, or all of the pinch rollers may be rubberized.

In some embodiments one, some, or all of the pinch rollers may rotate freely; alternatively, or additionally, the rotation of one, some, or all of the pinch rollers may be driven. The rotation of such pinch rollers may be driven such that the tangential velocities of the surfaces of the pinch rollers are equal to the tangential velocities of the surfaces of the first or second roller to which they are adjacent.

In some embodiments, the pinch rollers may be in contact with the surfaces of the first or second rollers to which they are adjacent; alternatively, there may be a small gap between the surfaces of the pinch roller and the first or second roller, the thickness of which may correspond to the thickness of flexible material to be handled by the system. In other embodiments the pinch rollers may be displaceable with respect to the first or second roller such that their separation may be increased as additional layers are wound onto the first or second roller.

In some embodiments at least one pinch roller is arranged adjacent each of the first and second rollers. In some embodiments multiple pinch rollers may be arranged adjacent one or both of the first and second rollers. In particularly preferred embodiments a single pinch roller is arranged adjacent the surface of the second roller (which is a storage roller) and two pinch rollers are arranged adjacent the surface of the first roller (which is a pick-up and place roller), one of which is arranged above the axis of rotation of the first roller and the other of which is arranged below the axis of rotation of the second roller.

The system may comprise one or more drive means for driving the first and second roller. In some embodiments the rotation of the first and second rollers may be coupled such that they rotate together, in other embodiments they may be rotated independently, for example by separate drive means. The drive means may be connected to the axles of the rollers, or may be coupled thereto by one or more belts, interlocking gears, drive chains, or other mechanical linkages.

The drive means may be electrical motors; the system may comprise a mains energy connection, a connection to a generator, and/or a rechargeable battery or other energy storage means.

The system may comprise an imaging means, which may be for monitoring a sheet of flexible material as it is wound around, onto, or over the first and second rollers, for monitoring a sheet of flexible material to be picked up by the system, for monitoring a surface onto which a sheet of material is to be deposited by the system, and/or for monitoring a sheet of material as it is being and/or after it has been deposited by the system. The imaging system may detect when any defects in the sheet of flexible material or the winding thereof occur.

In some embodiments, the system may comprise a plurality of imaging means as described above, each of which may be for one or more different purposes. For example, one of the imaging means may be for monitoring a surface before a sheet of flexible material is deposited thereon, and another may monitor the sheet of material after it has been deposited to ensure that it is free from defects.

In some embodiments, the behaviour of the system may respond to observations or detections made by the imaging system. For example, upon detection of certain stimuli the imaging system may send a control signal to components of the system such as motors driving the rollers, one or more of the releasable connectors, or to a control system comprised by the system.

The system may comprise a control system which may be a processing means. The control system may be in communication with, and/or may control the drive means for rotating the first and/or second rollers, the first, second and/or third releasable connectors (which may be individually addressable by the control means), drive means for rotating the pinch rollers, the support displacing means, and/or the imaging means.

The system may comprise a flexible material cutting means intermediate the first and second rollers. Such a cutting means may be for cutting a sheet of flexible material wound at least partially over both or the first and second rollers, or which is wound over at least one of the rollers and is held by the array of third releasable connectors.

The system may comprise a material connecting means for connecting multiple sheets of flexible material (or layers thereof) to each other. The material connecting means may be located intermediate the first and second rollers. The material connecting means may be for tacking one sheet of flexible material (or layer thereof) to another by means of heat and/or by means of chemical adhesion.

In some embodiments the system may comprise more than two main rollers (the first two main rollers being the first and second rollers). Each of the additional main rollers may be substantially similar or identical to the first and second rollers; the additional main rollers each comprising a corresponding plurality of releasable connectors. The additional main rollers may be arranged with respect to each other and with respect to the first and second main rollers in the same manner as the first and second main rollers are arranged with respect to each other. The additional main rollers may have any of the optional features of the first and second rollers described above, including additional associated components such as pinch rollers.

In some such embodiments the array of third releasable connectors (and any displaceable support upon which they are supported) may be displaceable at least one of the additional rollers as well as the first and second rollers and in some embodiments, may be displaceable between at least all of the main rollers (including the first, second and additional rollers).

Alternatively, or additionally, the system may comprise a plurality of arrays of releasable connectors each of which are displaceable between at least two of the main rollers (the first, second, and additional rollers).

In some embodiments, one, some, or all of the first roller, second roller, and/or the additional main rollers may be lengthwise displaceable with respect to the other main rollers.

One, some, or all of such rollers may each be supported between a pair of carrier supports (for example, plates or mountings which house bearings or bushings into which an axle comprised by the roller extends) which may be mounted on and displaceable along tracks. Each of the tracks may be parallel to the axis of rotation of the roller mounted thereon.

In such embodiments the array of third releasable connectors (and/or the displaceable support thereof, and/or any additional arrays of releasable connectors comprised by the system) may be significantly longer than the rollers. The arrays may be as long as the track along which the rollers are displaceable. This may allow the rollers to be displaced lengthwise while remaining accessible to the array of releasable connectors.

In such embodiments, pinch rollers comprised by the system and associated with the rollers may be significantly longer than the rollers. The pinch rollers may be as long as the track along which the rollers are displaceable. This may allow the rollers to remain adjacent the pinch rollers as they are lengthwise displaceable. Alternatively, the pinch rollers may be displaceable with the rollers, for example, they may be supported by the same carrier supports as the rollers.

In some embodiments, one, some, or all of the first, second, and/or additional rollers may be releasable, detachable, and/or removable from the system. In some embodiments, rollers which are storage rollers may be removable so as to allow wound rollers of flexible material to be removed for storage or be attached for deployment.

The invention will now be described by way of example only, with reference to the figures.

DETAILED DESCRIPTION OF THE FIGURES

Figure 1:
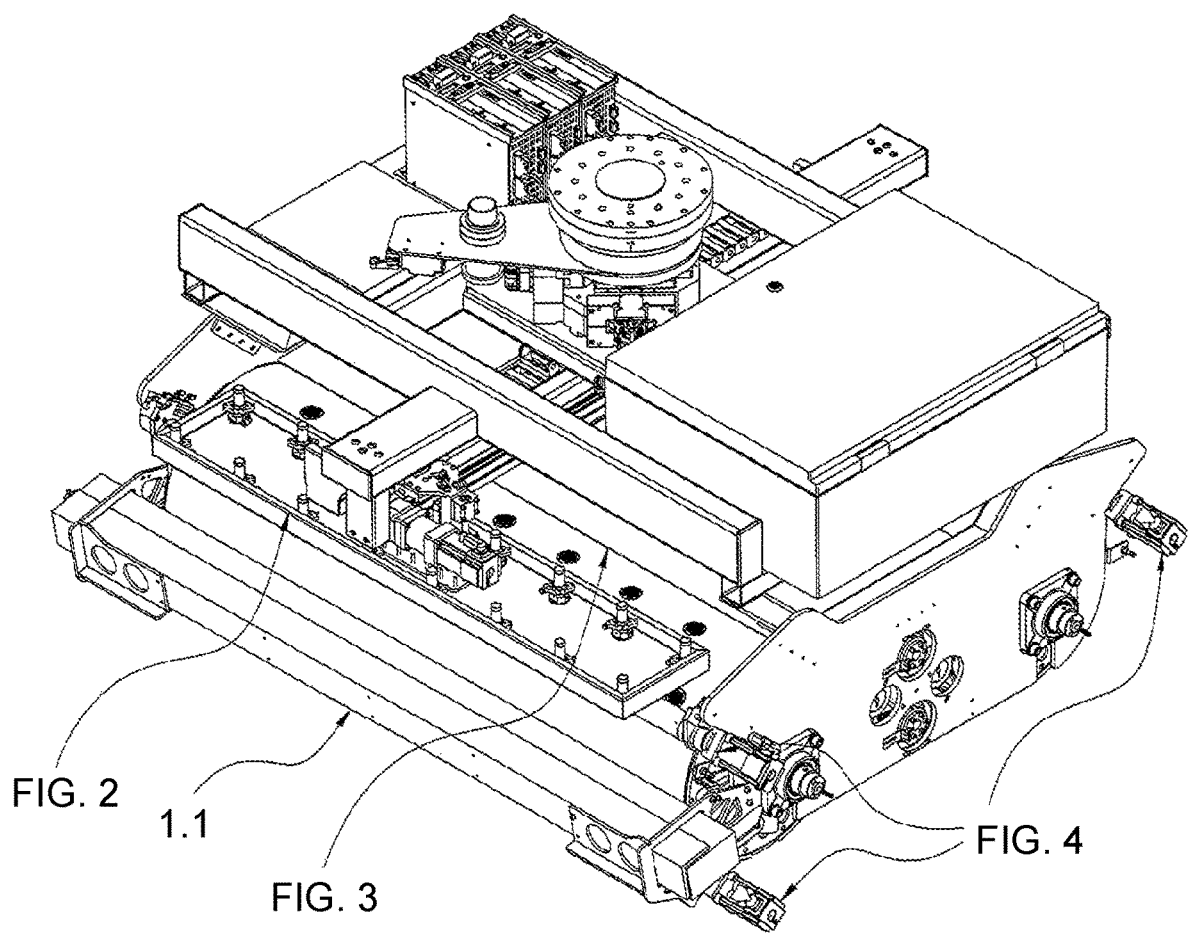
FIG. 1 is an overall isometric view of a first system for handling flexible material according to the present invention.

Referring to FIGS. 1 to 6 there is shown a first system for handling flexible material according to the present invention, the system comprising: a first roller 5.2 which comprises a plurality of first releasable connectors 3.2, a second roller 5.3 which comprises a plurality of second releasable connectors; an array of third releasable connectors 2.1 supported upon a displaceable support 5.1; three pinch rollers 5.4; means 2.2, 2.3 for displacing the displaceable support 5.1; an imaging unit 1.1, 5.7; means 5.5 for driving the first and second rollers 5.2, 5.3; control and driver units 5.6; and a carrier for supporting the other elements of the system.

In use, the system picks up, holds, and deposits sheets of flexible material. The system may be used to handle sheets of carbon fibre fabric, for example, for use in the construction of aerofoils.

In order for a sheet of flexible material to be picked up by the system, it is attached to the first roller 5.2 (the pick-up and place roller) at a first edge of the sheet (which during a pick-up operation is the sheet's leading edge) by the first releasable connectors 3.2. The leading edge is then wound partially around the first roller 5.2, between the first roller 5.2 and two pinch rollers 5.4 arranged adjacent the first roller 5.2 which press the flexible material against the surface of the first roller 5.2.

After the flexible material has passed the two pinch rollers 5.4, the first releasable connectors 3.2 are able to release the flexible material and the friction between the flexible material and the surface of the first roller 5.2 ensures that the flexible material will continue to be wound by the rotation of the first roller 5.2. The release of the leading edge of the flexible material by the first releasable connectors 3.2 leaves it free to be engaged by the third releasable connectors 2.1 when it reaches the top of the first roller 5.2.

The displaceable support 5.1, upon which the third releasable connectors 2.1 are supported is then displaced from the first roller 5.2 to the second roller 5.3 (the storage roller), along with the first edge of the sheet of flexible material. The first edge is then engaged by the second releasable connectors of the second roller 5.3 and released by the third releasable connectors 2.1. The sheet of flexible material may then be wound around the second roller 5.3 and between the second roller 5.3 and a single adjacent pinch roller 5.4. The sheet of flexible material is therefore pulled over and around the first roller 5.2 and onto the second roller 5.3.

A sheet of flexible material held and stored by the system therefore has its first edge in contact with the outer surface of the second roller 5.3. The second releasable connectors comprised by the second roller 5.3 engage with a surface of the sheet of flexible material adjacent the first edge. The sheet of flexible material extending from the first edge is then wound around the second roller 5.3 in a spiral arrangement as many times as is necessary to store the desired area of the flexible material. The outermost layer of the sheet of flexible material extends substantially off of the second roller 5.3 near or at its top over the gap between the rollers 5.2, 5.3 to the top of the first roller 5.2. The sheet of flexible material extends over the first roller 5.2 without being wound therearound, leading to a second edge opposite the first edge (in this arrangement the second edge of the sheet of flexible material, distal from the first edge, is considered the leading edge).

In order to deposit the flexible material from the system both rollers may be rotated simultaneously (clockwise from the perspective of FIG. 5) to wind the sheet of flexible material off of the second roller 5.3. When all but the first edge of the sheet of flexible material has been wound off of the second roller 5.3 the pick-up method described above may be reversed to deposit the first edge of the sheet from the system.

In the illustrated embodiment, the first and second rollers 5.2, 5.3 are right cylindrical rollers with equal radii and equal lengths which about their central longitudinal axes.

The longitudinal and rotational axes of the two rollers 5.2, 5.3 are parallel to each other and a first end of the first roller is coplanar to a first end of the second roller within a first plane orthogonal to the rotational axes of the rollers, and a second end of the first roller is coplanar to a second end of the second roller within a second plane orthogonal to the rotational axes of the rollers. The two rollers 5.2, 5.3 are spaced apart with a gap between them such that they do not contact each other and interfere with each other's rotation.

Therefore, the lengths of the two rollers 5.2, 5.3 are parallel and overlap, allowing sheets of flexible material to be wound off of one roller onto the other without becoming twisted or kinked.

The maximum width of a sheet of flexible material that can be held and handled by the system is limited by the length of the rollers.

Figure 3:
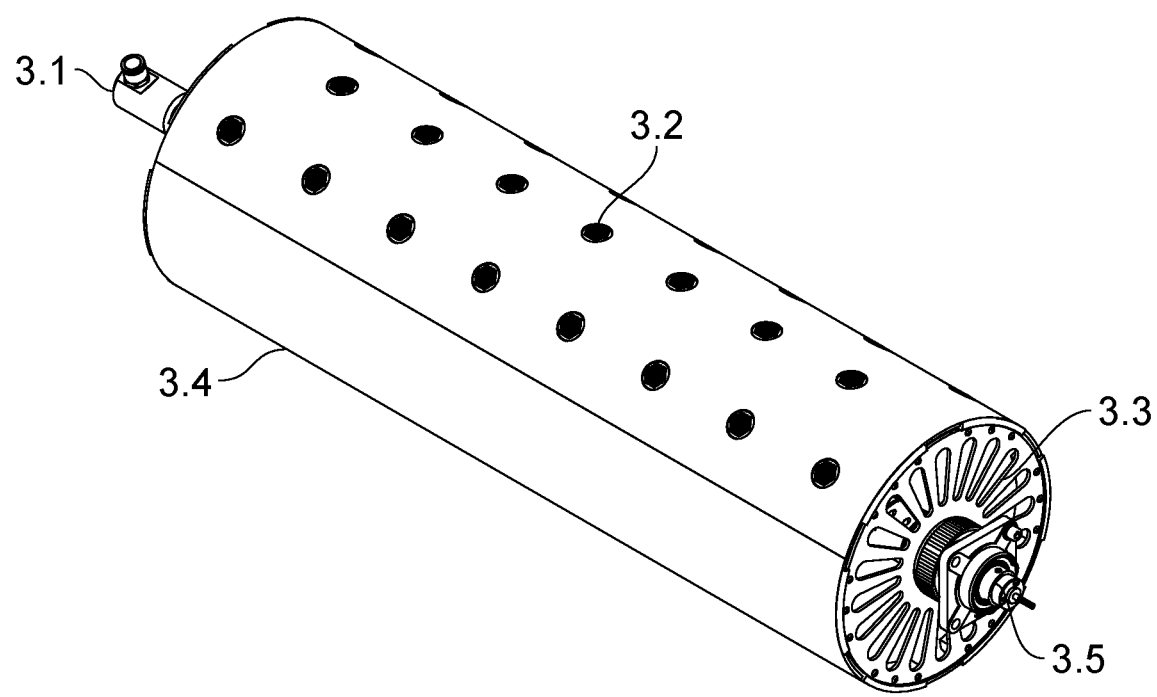
FIG. 3 is an isometric view of one of the first and second rollers comprised by the first system.
Figure 5:
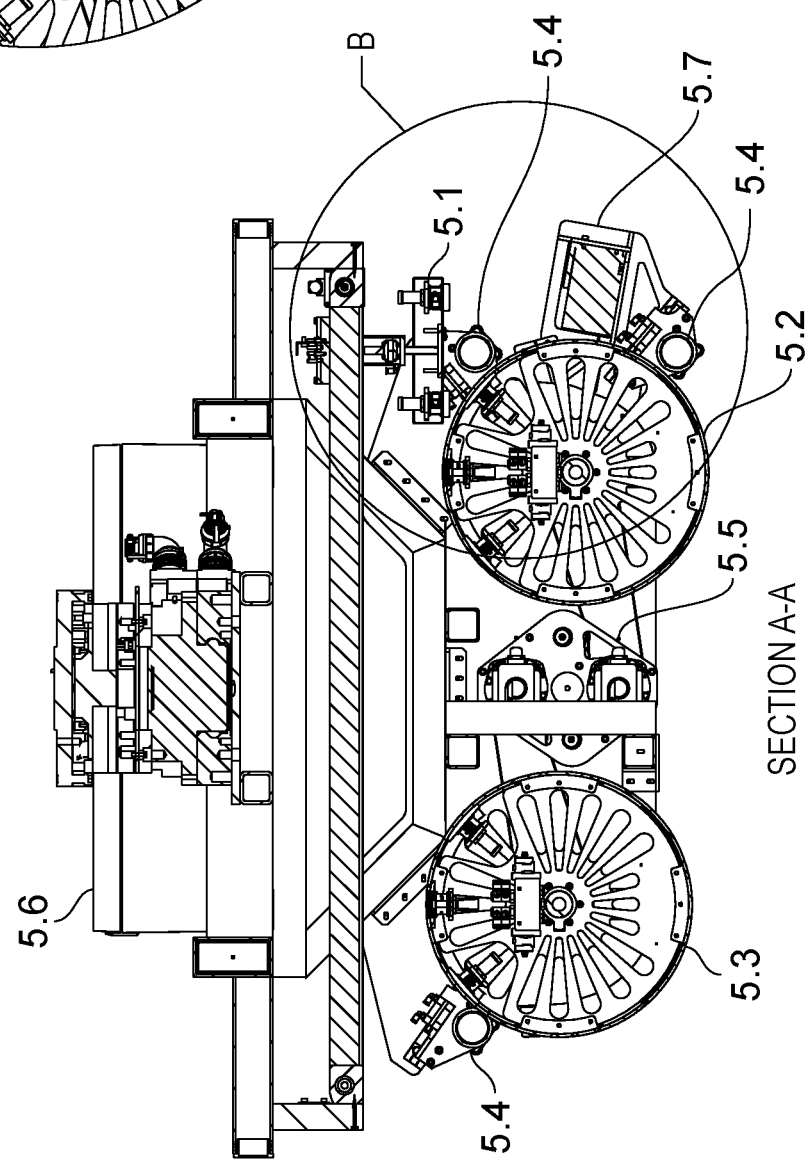
FIG. 5 shows an end view of the first system as well as a cross sectional view therethrough.

An overall detailed view of the first roller 5.2 is shown in FIG. 3, and cross-sectional views of the first and second rollers 5.2, 5.3 are shown in FIG. 5. In the illustrated embodiment, the two rollers have identical structures but may be driven and controlled separately.

The cylindrical first and second rollers 5.2, 5.3 are each a hollow cylinder with a substantially solid curved lateral surface 3.4 and vented circular end faces 3.3. The first and second releasable connectors are located substantially within the hollow interiors of the first and second roller 5.2, 5.3 respectively.

The first and second rollers 5.2, 5.3 each comprise a central cylindrical axle for transmitting compressed air, electrical power and electrical control signals from the remainder of the system to the first and second releasable connectors. The axles are fixed to and rotate along with the cylindrical bodies of the rollers.

Compressed air is delivered to the axles at first ends thereof via a pneumatic slip ring 3.1 which allows compressed air to be continuously provided as the rollers 5.2, 5.3 and axles thereof are rotating. Compressed air may be delivered to the rollers from some external system, such as a pump.

Electrical power and control signals for the releasable connectors 3.2 are delivered to the axle at a second end thereof opposite to the first end via an electrical slip ring 3.5.

The first and second releasable connectors are compressed air operated vacuum connectors 3.2. In use, the releasable connectors 3.2 may each be actuated independently by control signals delivered by electrical conduits comprised by the axles to attach to or to release sheets of flexible material.

In response to the electrical control signals valves may be opened allowing compressed air into the releasable connectors 3.2 via an airline from the axle. Within the releasable connector 3.2, the compressed air passes through a nozzle before proceeding to an exhaust; as a result of the venture effect the passage of the compressed air through the nozzle creates an area of low pressure which sucks external air into the vacuum connector 3.2 through a vacuum inlet comprised by the vacuum connector 3.2, thereby creating an external suction force. The valve may be closed in response to a subsequent control signal, thereby removing the suction through the vacuum inlet.

The vacuum connectors 3.2 may comprise means for adjusting the diameter of the nozzles in response to further control signals delivered along the axle, adjusting the diameter of the nozzles adjusts the suction force through the vacuum inlets.

The compressed air and air sucked in through the vacuum inlets is expelled through exhausts comprised by the vacuum connectors 3.2 into the hollow interior of the rollers 5.2, 5.3. This air may then escape the rollers through the vented circular end faces 3.3, thereby preventing a build-up of pressure within the rollers.

The vacuum inlets of the releasable vacuum connectors 3.2 define flexible material engaging elements of the releasable connectors 3.2 at which the releasable connectors 3.2 and the first and second rollers 5.2, 5.3 releasable connect to and engage with sheets of flexible material.

A plurality of circular apertures are formed through the curved lateral surfaces 3.4 of the first and second rollers 5.2, 5.3, connecting the exterior of the rollers 5.2, 5.3 to their hollow interiors. The releasable connectors 3.2 extend are aligned along radial axes of the rollers 5.2, 5.3, and extend from the circular apertures formed in the curved lateral surfaces 3.4 towards the central axle.

The radially extending ends of the releasable connecters 3.2 are located within the circular apertures formed in the curved lateral surfaces 3.4, such that they are flush with the curved lateral surfaces 3.4 of the cylindrical first and second rollers 5.2, 5.3.

The vacuum inlets comprised by the releasable connectors 3.2 are located within the circular apertures at and flush with the curved lateral surface 3.4 of the rollers. The inlets are flush with the surrounding portions of the curved lateral surface 3.4, such that the suction force is normal to the curved surface 3.4 and directed radially inwards towards the central rotational axis of the roller (the hexagonal vacuum inlets can be seen in FIG. 3).

The circular apertures and the vacuum inlets of the releasable connectors 3.2 are arranged in three parallel longitudinal lines along the curved lateral surface 3.3 of the rollers 5.2, 5.3. The central line on each roller includes seven regularly spaced circular apertures and releasable connectors 3.2, and the two outer lines include eight regularly spaced circular apertures and releasable connectors 3.2. The apertures and connectors 3.2 of the central line being offset between the releasable connectors of the outer lines.

The releasable connectors 3.2 extend radially inwards from the circular apertures towards the central axis, the radial axes along which the releasable connectors of the three lines are located are separated by 40° such that each line of releasable connectors are spaced one ninth of the way around the curved surface 3.3 of the cylindrical rollers 5.2, 5.3. It is not necessary for releasable connectors to located around the full circumference of the cylinder as sheets of flexible material are only engaged by the rollers 5.2, 5.3 adjacent to their edges.

Figure 2:
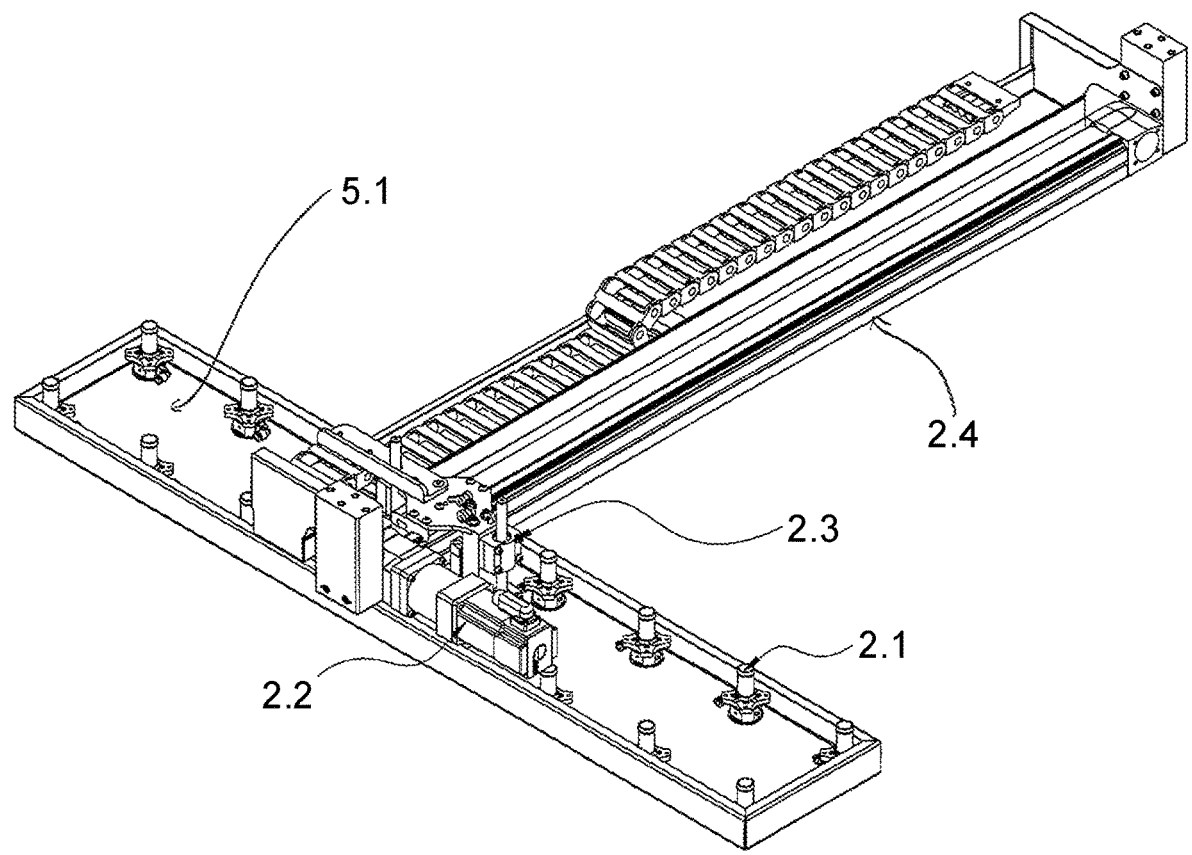
FIG. 2 is an isometric view of a displaceable array of releasable connectors comprised by the first system.

FIG. 2 shows the displaceable support 5.1 and the means 2.2, 2.3 for displacing the displaceable support 5.1 in detail. A cross section of the displaceable support may be seen in FIGS. 5 and 6.

The displaceable support 5.1 is an elongate horizontal rectangular plate with short vertical walls extending upwards from its edges, thereby defining a shallow open-topped cuboid cavity.

Sixteen circular apertures are formed in the horizontal plate in two parallel lines of eight regularly spaced apertures adjacent the long edges of the rectangle shape.

A releasable vacuum Venturi connector 2.1 of the same type as the releasable connectors 3.2 comprised by the rollers 5.2, 5.3 extends vertically upwards from each of circular apertures formed in the rectangular plate with their ends and vacuum inlets located within the circular apertures flush with the lower face of the horizontal rectangular plate. Therefore, the displaceable support comprises a two by eight grid of regularly spaced releasable connectors.

The releasable connectors 2.1 supported on the releasable support 5.1 are provided with compressed air by airlines (not shown) and operate in the same manner as the releasable connectors 3.2 comprised by the first and second rollers 5.2, 5.3.

As such the releasable connectors 2.1 are actuatable to selectively produce upwards suction forces, thereby allowing the displaceable support 5.1 to pick up and release a sheet of flexible material at its edge.

The means for displacing the displaceable support comprise a lift mechanism 2.3 for selectively displacing the displaceable support 5.1 vertically upwards and downwards, and a track mechanism for displacing the displaceable support and the lift mechanism 2.3 horizontally along a horizontal track 2.4 perpendicular to the horizontal rotational and longitudinal axes of the first and second rollers 5.2, 5.3. The track mechanism being driven by a servo motor 2.2 supported upon the displaceable support 5.1.

The displaceable support 5.1 and means for displacing the displaceable support 2.2, 2.3 are located above the first and second rollers (as shown in FIGS. 1 and 5). The track mechanism allows the displaceable support 5.1 and the lift mechanism 2.3 to be to be displaced to and between positions above the first and second rollers, to positions above the gap between the first and second rollers 5.2, 5.3, and—in some embodiments—to positions above the far sides of each of the first and second rollers 5.2, 5.3 from the other of the two rollers 5.2, 5.3.

When the displaceable support 5.1 is located above one of the first and second rollers, the lift mechanism 5.3 may be actuated to lower the displaceable support 5.1 to the roller, such that the releasable connectors supported by the releasable connector are able to engage with flexible material supported on or wound around the roller. The lift mechanism may also be actuated to lift the displaceable support 5.1 along with any sheet of flexible material connected thereto vertically away from the roller.

Together the displaceable support 5.1, the releasable connectors 2.1 supported thereon, and the means for displacing the displaceable support comprise a linear transport stage for transferring flexible material sheets or elements thereof between the first and second rollers 5.2, 5.3.

Figure 4:
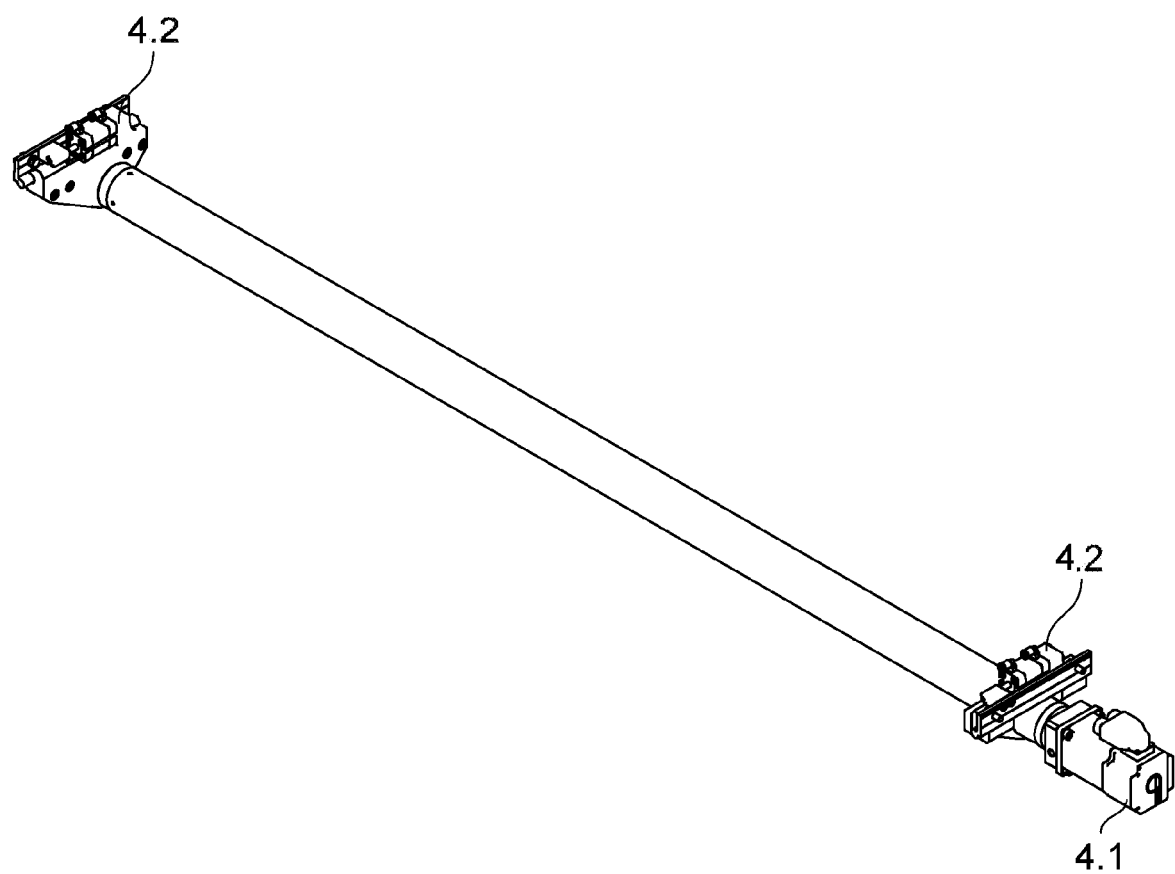
FIG. 4 is an isometric view of one of the pinch rollers comprised by the first system.
Figure 6:
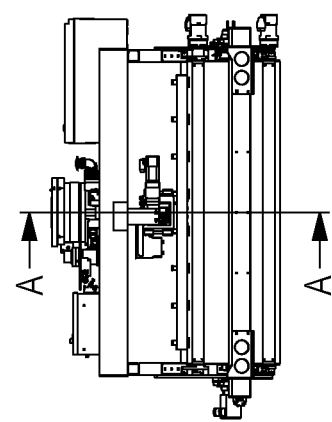
FIG. 6 is a detailed view of a portion of the cross-sectional view of FIG. 5.
Figure 6:
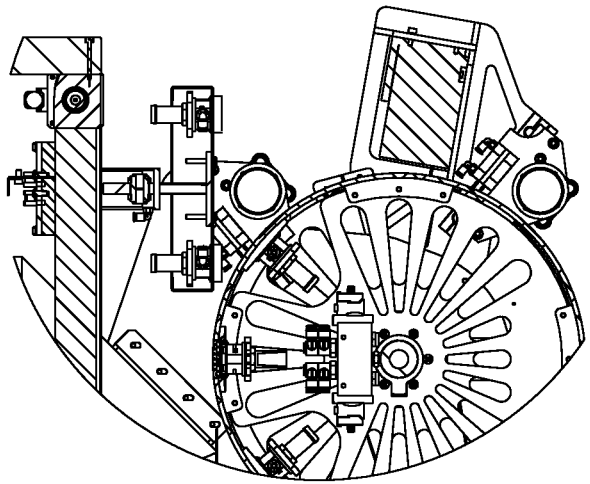

FIG. 4 shows a pinch roller 5.4, three of which are comprised by the system (as shown in FIG. 5).

The pinch rollers 5.4 are cylindrical rollers with approximately the same length as the first and second rollers 5.2, 5.3, and significantly smaller radii. The pinch rollers 5.4 are each supported from a pair of linear slide rails 4.2, the pinch rollers 5.4 each comprising a pair of mounts for engaging with the rails at opposite ends of their lengths, and actuators for displacing the rollers along the lengths of the rails.

The pinch rollers are displaceable along the linear slide rails 4.2 into and out of contact with the curved lateral surfaces 3.4 of the first and second rollers 5.2, 5.3. In use, the pinch rollers may ensure that flexible material wound onto and around the first and second rollers 5.2, 5.3 is pressed against the curved lateral surfaces 3.4 of the first and second rollers 5.2, 5.3. The linear slide rails 4.2 allow the pinch rollers to be displaced outwards as additional layers are wound onto the second roller and allows the pinch rollers to be displaced away from the surface of the rollers, for example, when flexible material is being released and/or engaged by the releasable connectors.

Each of the pinch rollers 5.4 comprises a servo motor 4.1 at one end of the pinch roller 5.4. The servo motor 4.1 drives the rotation of the pinch roller ensuring that the speed of the surface of the pinch roller 5.4 matches that of the first or second roller 5.2, 5.3 against which it is held or pressed. This prevents any flexible material from becoming stretched or deformed as a result of contact with the pinch roller 5.4.

Two pinch rollers 5.4 are arranged adjacent to the first roller 5.2, on the far side from the second roller 5.3, the two pinch rollers 5.4 contacting the curved lateral surface 3.4 of the first roller 5.2 at 40° above and 40° below the horizontal. One pinch roller 5.4 is arranged adjacent to the second roller 5.3 on the far side from the first roller 5.1, the pinch roller 5.4 contacting the curved lateral surface 3.4 of the second roller 5.3 at 40° above the horizontal.

The system comprises a carrier upon and from which the other components of the system are supported. The carrier comprises an upper framework, below which the displaceable support 5.1 and the means 2.2, 2.3 for displacing the displaceable support are suspended and upon which control and driver units 5.6 are supported. The carrier further comprises a pair of parallel vertical plates suspended below the framework from which the first, second and pinch rollers 5.2, 5.3, 5.4 and imaging system 1.1, 5.7 are supported and between which they extend. The means 5.5 for driving the first and second rollers 5.2, 5.3 are also supported on one of the vertical plates.

The carrier may be used to manipulate or transport, for example it may be suspended from a gantry, a crane, or a robot arm to allow the system to moved or aligned with a sheet of flexible material to be handled.

The means 5.5 for driving the first and second rollers 5.2, 5.3 comprise a pair of servo motors, each of which is associated with and drives one of the first and second rollers 5.2, 5.3. Each of the servo motors is connected by a belt to a portion of one of the axles intermediate the vented circular ends 3.3 and the electrical slip rings 3.5. Therefore, the servo motors drive the belts which in turn drive the rotation of the first and second rollers 5.2, 5.3. In use the two rollers are rotated at the same speed such that the instantaneous tangential velocities of their surfaces are equal.

The means 5.5 for driving the rollers 5.2, 5.3 are located intermediate the first and second rollers 5.2, 5.3 on one of the pair of parallel vertical plates comprised by the carrier.

The ends of the axles of the first and second rollers 5.2, 5.3 at which the pneumatic and electrical slip rings 3.1, 3.5 are located are the points at which the rollers 5.2, 5.3 connect to and rotate with respect to the vertical plates comprised by the carrier.

The imaging unit 1.1, 5.7 is a line scanner supported from the pair of parallel vertical plates comprised by the carrier. The line scanner is supported adjacent to the first roller 5.2 on the far side from the second roller 5.3. The line scanner is a wide-angle imager supported in a housing and in use detects the edge of a sheet of flexible material, thereby allowing the system to align a sheet of flexible material with the roller and to detect and edge of a sheet of material as it is being wound.

In use, the imaging unit 1.1, 5.7 is used to monitor the leading edge and the side edges of a sheet of flexible material. This allows the edges of the sheet of flexible material to be deposited, for example in a mould, with a high degree of accuracy. The monitoring of the side edges may allow the position of the system to be offset so as to make highly accurate butt joints along the length of the sheet of flexible material. The imaging unit 1.1, 5.7 may also be used to inspect the surface of the sheet of flexible material for any defects or foreign objects.

Figure 7:
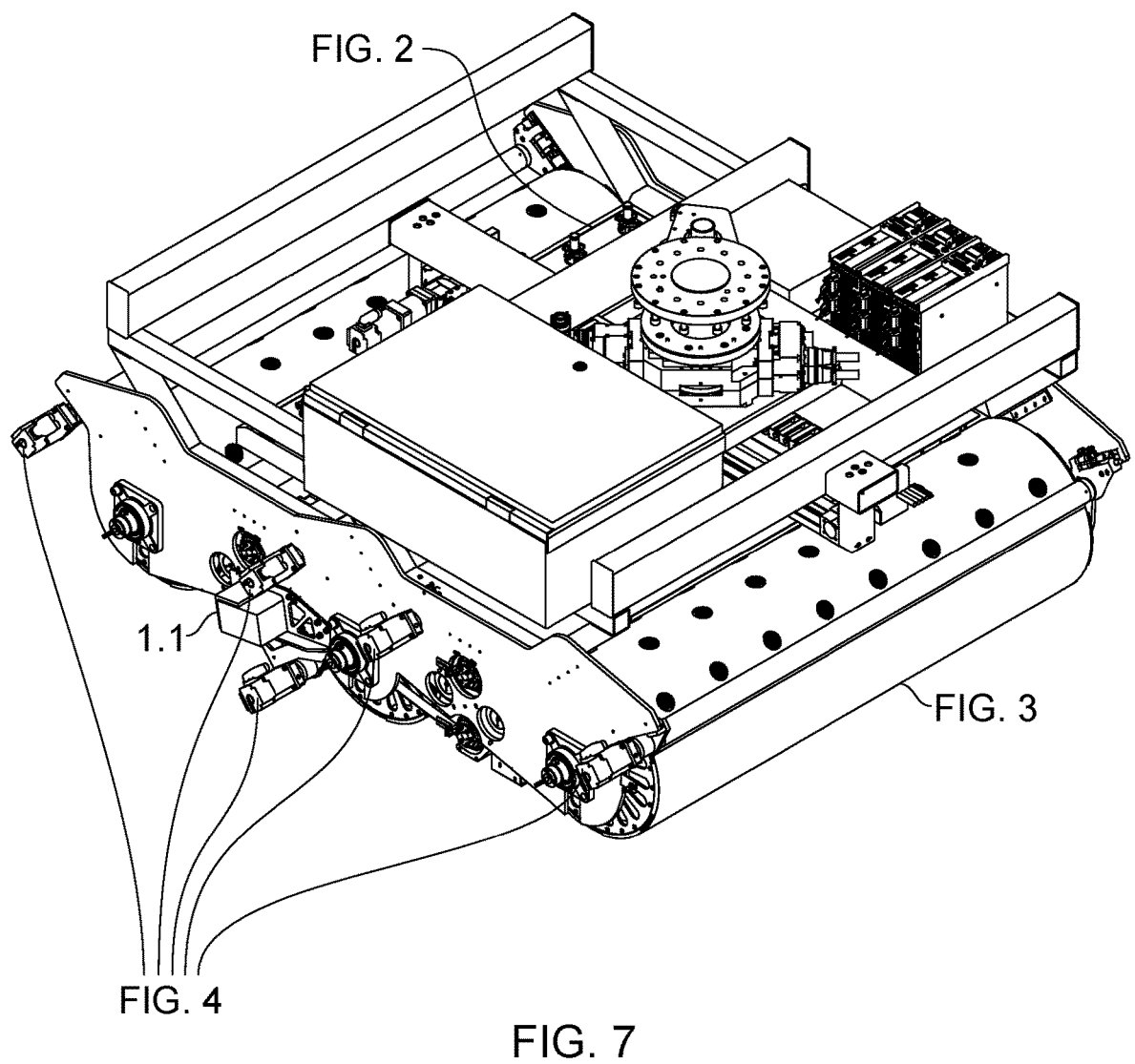
FIG. 7 is an overall isometric view of a second system for handling flexible material according to the present invention which comprises three main rollers.
Figure 9:
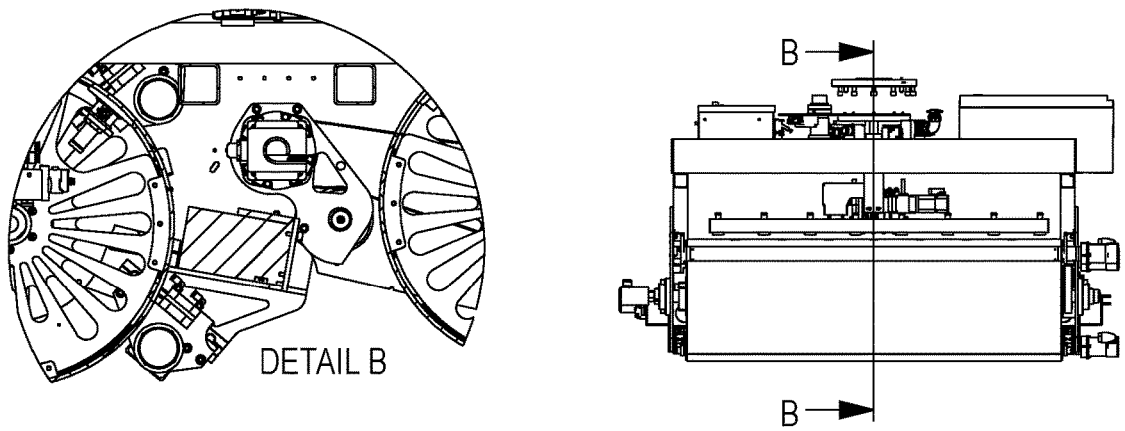
FIG. 9 is a detailed view of a portion of the cross-sectional view of FIG. 8.
Figure 8:
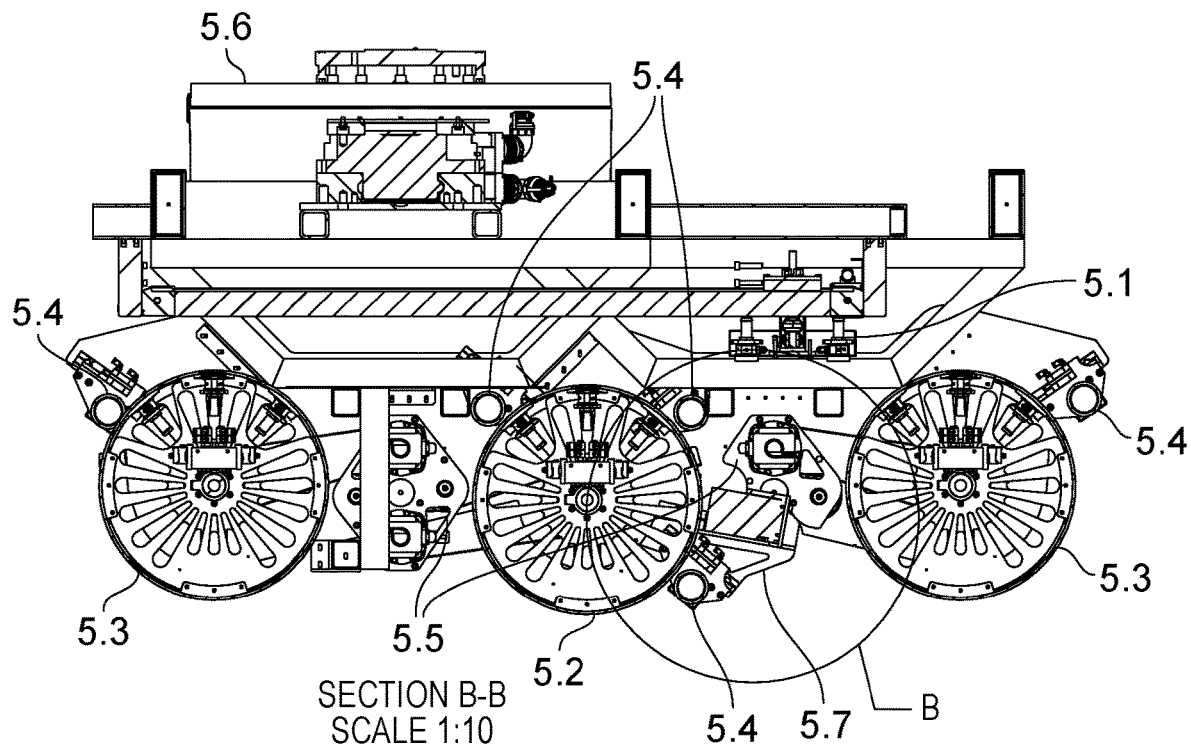
FIG. 8 shows an end view of the second system as well as a cross sectional view therethrough.
Figure 10:
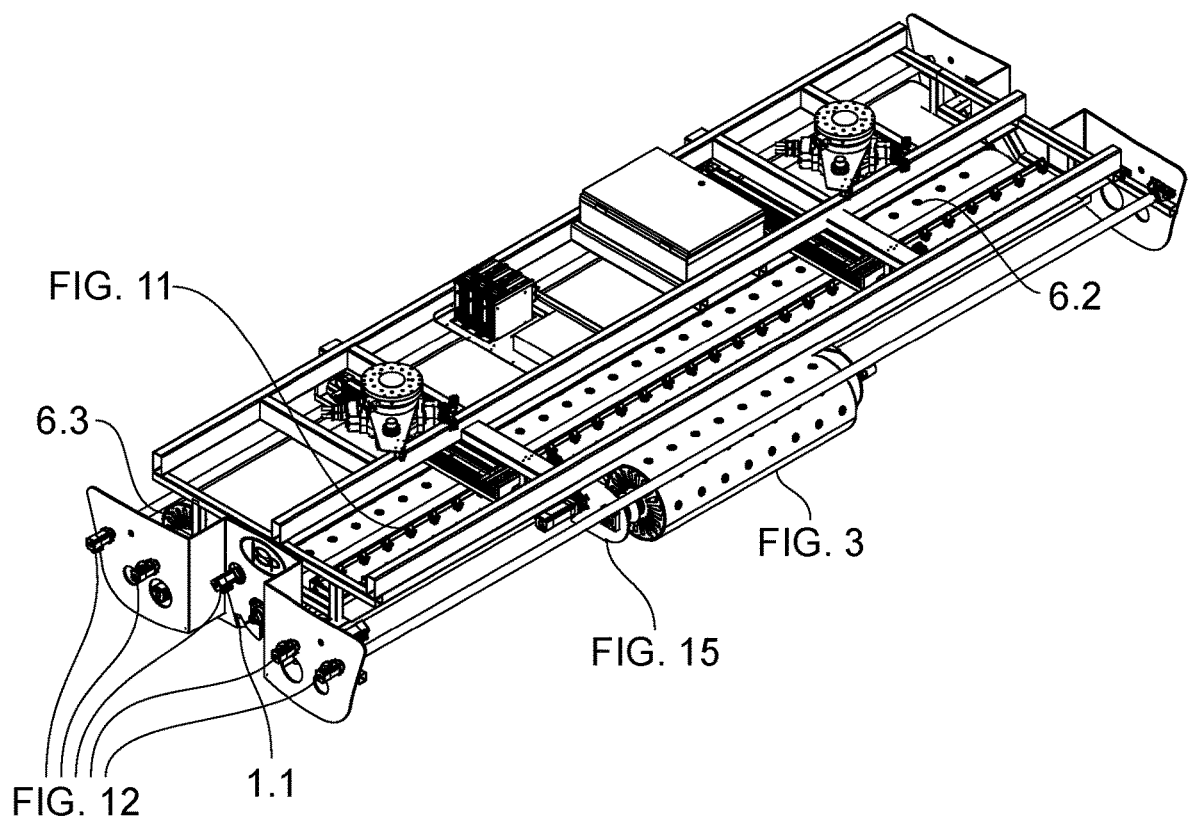
FIG. 10 is an overall isometric view of an elongated third system for handling flexible material according to the present invention comprising three rollers which are lengthwise displaceable.
Figure 11:
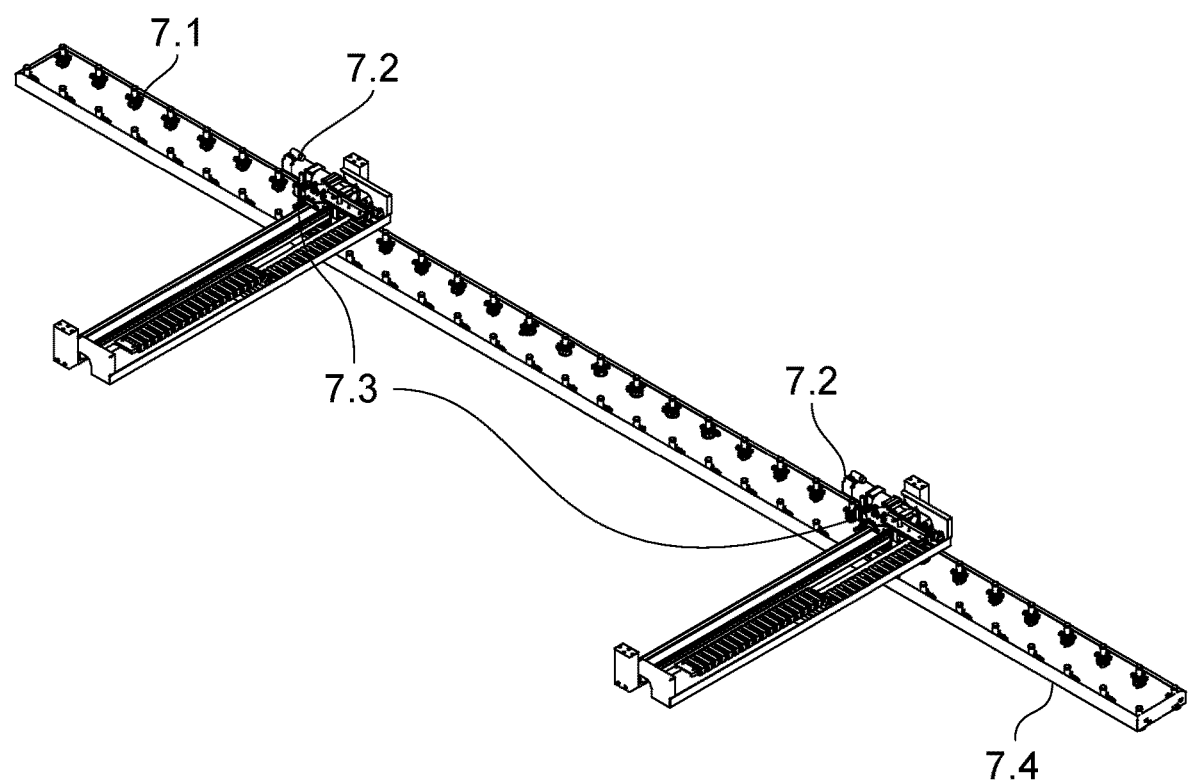
FIG. 11 is an isometric view of a displaceable array of releasable connectors comprised by the third system.
Figure 12:
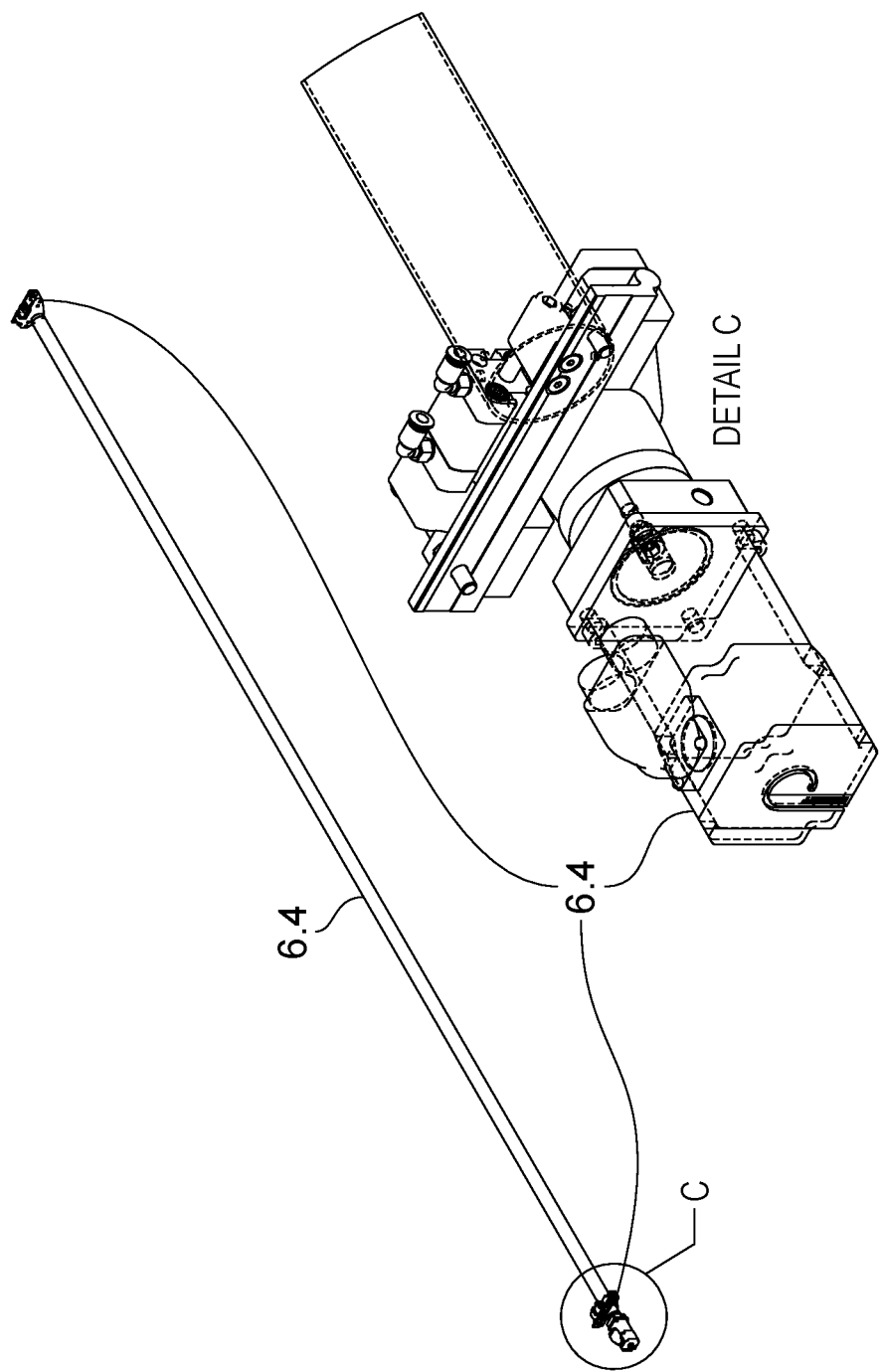
FIG. 12 is an isometric view of one of the pinch rollers comprised by the third system.
Figure 14:
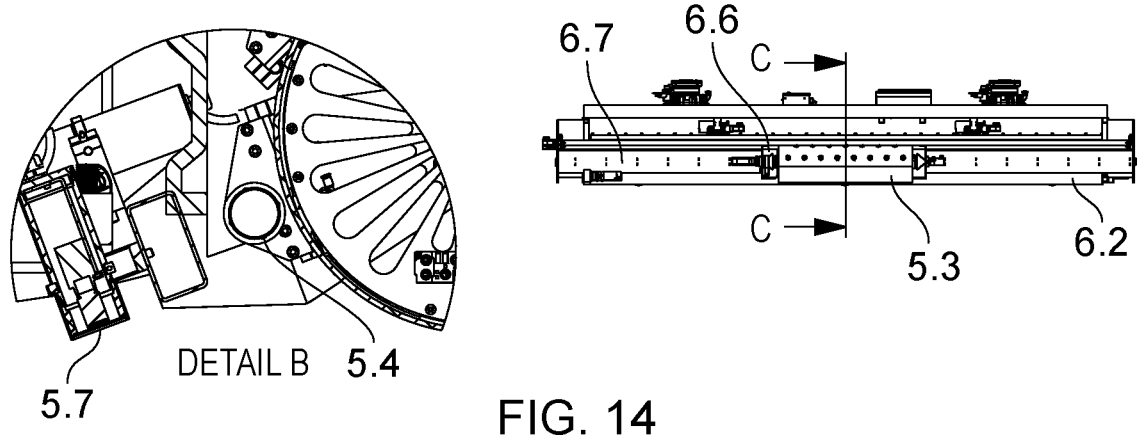
FIG. 14 is a detailed view of a portion of the cross section of FIG. 13.
Figure 13:
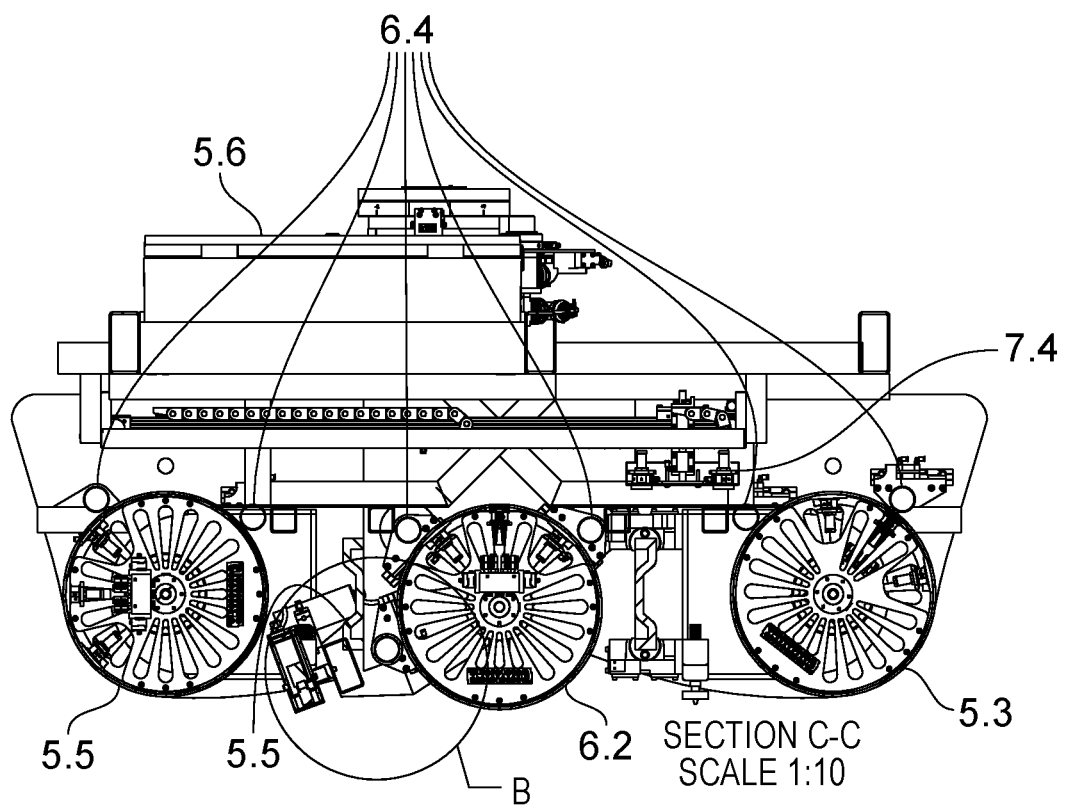
FIG. 13 shows an end view of the third system as well as a cross sectional view therethrough.
Figure 15:
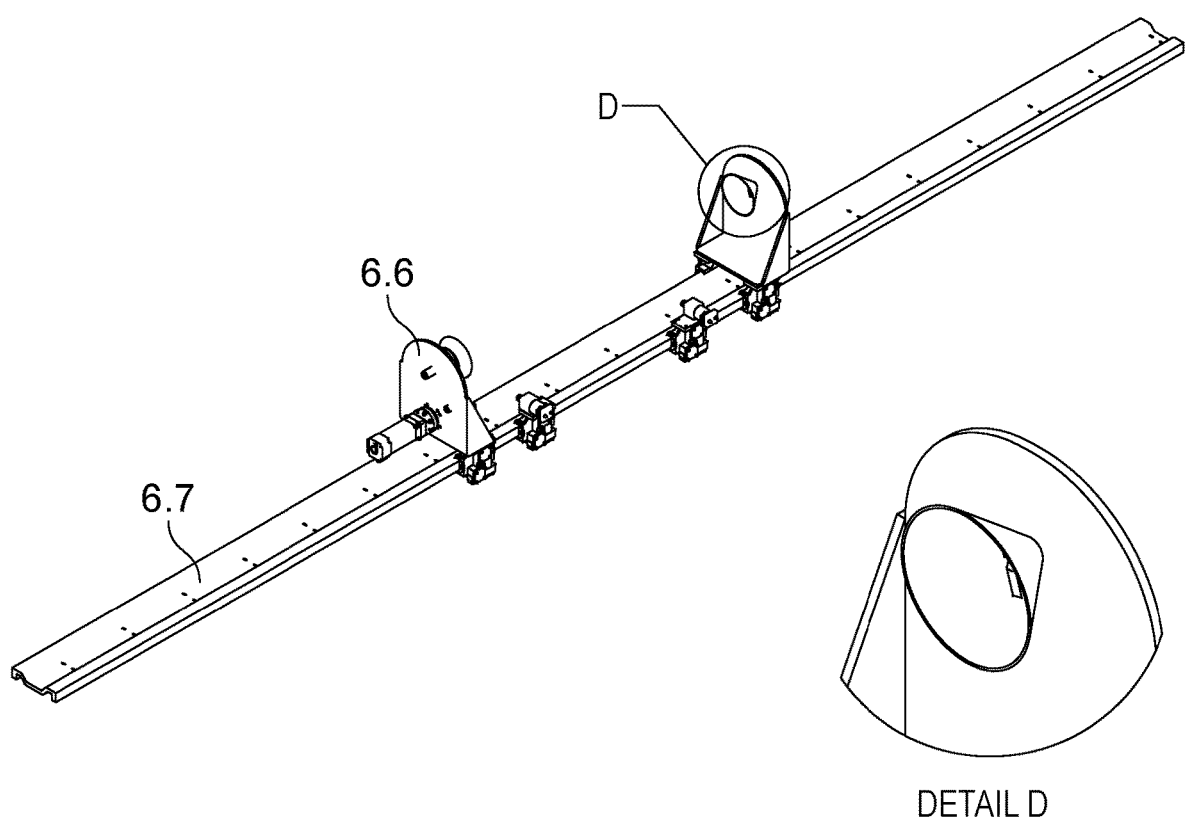
FIG. 15 is an overall view of a roller displacing means comprised by the third system.

Referring to FIGS. 7 to 9 there is shown a second system for handling flexible material according to the present invention. The second system being similar to the first system shown in FIGS. 1 to 6 and described above but comprising three main rollers with releasable connectors rather than two.

The second system comprises: a single primary pick-up and place roller 5.2 which comprises a plurality of first releasable connectors 3.2; two secondary storage rollers 5.3 each of which comprise a plurality of second releasable connectors; an array of third releasable connectors 2.1 supported on a displaceable support 5.1; five pinch rollers 5.4; means 2.2, 2.3 for displacing the displaceable support 5.1; an imaging unit 1.1, 5.7; means 5.5 for driving the primary and secondary rollers 5.2, 5.3; control and driver units 5.6; and a carrier for supporting the other elements of the system.

The primary pick-up and place roller 5.2 of the second system is identical in structure to, and serves the same purpose as, the first roller 5.2 comprised by the first system shown in FIGS. 1 to 6. Three pinch rollers are arranged adjacent the primary pick-up and place roller 5.2 in the second system instead of two.

The primary pick-up and place roller 5.2 is located intermediate the two secondary storage rollers 5.3. As in the first system, the primary and secondary rollers 5.2, 5.3 are all identical right cylindrical rollers arranged parallel to one another with coplanar ends and spaced apart such that gaps are provided between the rollers 5.2, 5.3.

The two secondary storage rollers 5.3 of the second system are each identical in structure to, and serve the same purpose as, the second roller 5.3 comprised by the first system shown in FIGS. 1 to 6. As in the first system, each storage roller 5.3 has a single associated pinch roller arranged adjacent thereto on the upper portion of the far side of the storage roller 5.3 from the pick-up and place roller 5.2.

The carrier is enlarged in comparison to the carrier shown in FIGS. 1 to 6 so as to support the additional storage roller 5.3 and pinch rollers 5.4.

The displaceable support 5.1, third releasable connectors 2.1 and the means 2.2, 2.3 for their displacement comprised by the second illustrated system are identical to those comprised by the first illustrated system. The displaceable support 5.1 and the array of third releasable connectors 2.1 supported thereon are displaceable between locations above one of the secondary storage rollers 5.3 and positions above the gap between the primary pick-up and place roller 5.2 and the other secondary storage rollers 5.3. It is envisioned that in other embodiments of the invention the array of third releasable connectors 2.1 and displaceable support 5.1 may be displaceable to positions above all three of the primary and secondary rollers 5.2, 5.3.

As in the first system, the imaging system 5.7 is arranged adjacent the primary pick-up and place roller 5.2.

The means 5.5 for driving the rollers 5.2, 5.3 of the second system comprises a third servo motor in addition to the two comprised by the first system. As in the first system the servo motors associated with the primary pick-up and place roller 5.2 and one of the secondary storage rollers 5.3 are located on a carrier side plate in the gap between these two rollers; the third servo motor comprised by the second system, which drives the additional secondary storage roller 5.3 is also supported on a carrier side plate and is located in the other gap between the pick-up and place primary roller 5.2 and the additional storage roller 5.3.

Referring to FIGS. 10 to 15 there is shown a third system for handling flexible material according to the present invention. The third system being similar to the first and second systems shown in FIGS. 1 to 9, but is significantly longer and comprises three main rollers, one of which is shorter than the other and displaceable along a track parallel to its lengths with respect to the remainder of the system.

The third system comprises: a long primary pick-up and place roller 6.2 which comprises a plurality of first releasable connectors; a long secondary storage roller 6.3 which comprises a plurality of second releasable connectors; a short secondary storage roller 5.3 which comprises a plurality of secondary storage rollers; an array of third releasable connectors 7.1 supported on a long displaceable support 7.4; six long pinch rollers 6.4; means 7.2, 7.3 for displacing the displaceable support 7.4; an imaging unit 1.1; means 5.5 for driving the primary and secondary rollers 6.2, 6.3, 5.3; control and driver units 5.6; a carrier for supporting the other elements of the system; and a track 6.7 along which the short secondary roller 5.3 is displaceable.

The long primary pick-up and place roller 6.2 is a longer version of the pick-up and place rollers 5.2 comprised by the first and second systems described above. The long primary pick-up and place roller 6.2 is approximately three times as long as the pick-up and place roller 5.2 but is otherwise identical in structure thereto.

The long secondary storage roller 6.3 is a longer version of the secondary storage rollers 5.3 comprised by the first and second systems described above and is identical in structure to the long primary pick-up and place roller 6.2.

The short secondary storage roller 5.3 is identical to the secondary storage rollers 5.3 comprised by the first and second systems described above.

The long primary pick-up and place roller 6.2 is located intermediate the two secondary storage rollers 6.3, 5.3. The three rollers are parallel to one another and the two long rollers 6.2, 6.3 have coplanar ends which are supported by vertical plates comprised by the carrier. The short secondary storage roller 5.3 is supported by a pair of sliding mountings 6.6 which are mounted on a track 6.7 which is located intermediate the short roller 5.3 and the long primary pick-up and place roller 6.2 and which runs parallel to the axis of rotation of the long roller along its full length between the vertical carrier plates.

The array of third releasable connectors 7.1 and the long displaceable support 7.4 are longer versions of the array of third releasable connectors 2.1 and the displaceable support 5.1 comprised by the first and second systems, the longer array 7.1 and support 7.4 have substantially the same length as the track 6.7 and the long rollers 6.2, 6.3. The third system comprises two means 7.2, 7.3 for displacing the displaceable support 7.4 which are otherwise identical to the means 2.2, 2.3 for displacing the displaceable support 5.1 of the first and second systems.

The long pinch rollers 6.4 are longer versions of the pinch rollers 4.1 comprised by first and second systems described above. The pinch rollers 6.4 are approximately three times as long as the pinch rollers 4.1 comprised by the first and second systems but is otherwise identical in structure thereto. Two pinch rollers are arranged adjacent each of the rollers above their axes of rotation. As the short roller 5.3 is displaced along the track 6.7 it is displaceable along the length of the long pinch rollers 6.4.

The invention has been described by way of example only and it will be appreciated that variation may be made to the embodiment described above without departing from the scope of the invention as defined by the claims.

The invention claimed is:

1. A system for handling sheets of flexible material, comprising:
    a first roller which comprises a plurality of first releasable connectors;
    a second roller which comprises a plurality of second releasable connectors; and
    an array of third releasable connectors arranged on a plate;
    wherein the array of third releasable connectors is displaceable between at least the first roller and the second roller; and
    the first, second and third releasable connectors releasably and without gripping an edge attach to a sheet of flexible material in use; wherein the sheet of the flexible material in use is picked without gripping an edge and wound around the second roller to store the flexible material.

2. The system according to claim 1 wherein in use the array of third releasable connectors lifts at least a part of the sheet of flexible material from one of the first and second rollers to the other.

3. The system according to claim 1 wherein the first, second and third releasable connectors releasably attach to surfaces of the sheet of flexible material in use.

4. The system according to claim 1 wherein in use the second releasable connectors attach the sheet of flexible material to the second roller for winding onto the second roller.

5. The system according to claim 1 wherein in use the first releasable connectors attach the sheet of flexible material to the first roller for winding at least partially around the first roller.

6. The system according to claim 1 wherein the first and second rollers are substantially cylindrical and are rotatable about their central longitudinal axes.

7. The system according to claim 1 wherein the first and second rollers have rotational axes which are fixed with respect to each other.

8. The system according to claim 1 wherein the first and second rollers have substantially horizontal rotational axes.

9. The system according to claim 1 wherein the first and second releasable connectors are located on lateral faces of the first and second rollers respectively.

10. The system according to claim 1 wherein the first and second releasable connectors are arranged to engage with the flexible material at surfaces of the first and second rollers respectively.

11. The system according to claim 1 wherein the first and second releasable connectors are regularly spaced over one or more lateral surfaces of the first and second rollers respectively.

12. The system according to claim 1 wherein the first and second releasable connectors are located substantially within the first and second rollers respectively.

13. The system according to claim 1 wherein the first and second releasable connectors are supported on one or more exterior surfaces of the first and second rollers respectively.

14. The system according to claim 1 wherein the first and second rollers each comprise a plurality of indentations formed in outer surfaces thereof, and the first and second releasable connectors are located within the plurality of indentations formed in the outer surfaces of the first and second rollers respectively.

15. The system according to claim 1 wherein the first and second rollers each comprise a hollow interior, and the first and second releasable connectors are each at least partially located within the hollow interiors of the first and second rollers respectively.

16. The system according to claim 1 wherein the first, second and third releasable connectors comprise suction cups, vacuum connectors, needle connectors, cryogenic connectors, manual grippers, electromagnetic connectors, electrostatic connectors, or any combination thereof.

17. The system according to claim 1 wherein the first and second releasable connectors each comprise a flexible material engaging element.

18. The system according to claim 1 comprising a first pinch roller which is parallel to and in contact with the first roller.

* * * * *